(12) United States Patent
Yamauchi et al.

(10) Patent No.: US 10,177,843 B2
(45) Date of Patent: Jan. 8, 2019

(54) NETWORK CONTROL APPARATUS AND TRANSMISSION QUALITY MARGIN CALCULATION METHOD

(71) Applicant: FUJITSU LIMITED, Kawasaki-shi, Kanagawa (JP)

(72) Inventors: Tomohiro Yamauchi, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/470,409

(22) Filed: Mar. 27, 2017

(65) Prior Publication Data

US 2017/0302372 A1  Oct. 19, 2017

(30) Foreign Application Priority Data

Apr. 19, 2016 (JP) ................................. 2016-083995

(51) Int. Cl.
*H04B 10/08* (2006.01)
*H04B 10/079* (2013.01)
*H04J 14/02* (2006.01)
*H04L 1/24* (2006.01)

(52) U.S. Cl.
CPC ... *H04B 10/07953* (2013.01); *H04B 10/0793* (2013.01); *H04B 10/07955* (2013.01); *H04B 10/07957* (2013.01); *H04J 14/02* (2013.01); *H04L 1/243* (2013.01)

(58) Field of Classification Search
CPC .......... H04B 10/07953; H04B 10/0793; H04B 10/07955; H04B 10/07957; H04J 14/02; H04L 1/243

USPC .......................................................... 398/26
See application file for complete search history.

(56) References Cited

U.S. PATENT DOCUMENTS 9,215,029 B2 * 12/2015 Han ..................... H04J 14/0221
9,722,698 B2 *  8/2017 Dahan ................ H04B 10/0793
9,859,976 B2 *  1/2018 Dahan .............. H04B 10/07953

FOREIGN PATENT DOCUMENTS

EP         1011221 A2    6/2000
JP         2015-050600   3/2015
WO         2015/132776 A1 9/2015

(Continued)

OTHER PUBLICATIONS

EESR—European Search Report issued for European Patent Application No. 17163027.0 dated Sep. 20, 2017.

(Continued)

*Primary Examiner* — M. R. Sedighian
(74) *Attorney, Agent, or Firm* — Fujitsu Patent Center

(57) ABSTRACT

A network control apparatus includes a processor. The processor calculates a first OSNR corresponding to an allowable limit BER from an OSNR yield strength curve of a transmission end in a node of a transmission end. The processor acquires a reception BER of a second node of a reception end, and calculates a second OSNR corresponding to the reception BER from the OSNR yield strength curve of the transmission end. The processor calculates a first noise intensity corresponding to the allowable limit BER from the first OSNR. The processor calculates a second noise intensity corresponding to the reception BER from the second OSNR. The processor calculates a noise intensity margin, based on the first noise intensity and the second noise intensity.

7 Claims, 23 Drawing Sheets

(56) References Cited

FOREIGN PATENT DOCUMENTS

WO    WO 2015/132776    *  9/2015   ........... H04B 10/079

OTHER PUBLICATIONS

Andrew J. Stark et al., "System Performance Prediction With the Gaussian Noise Model in 100G PDM-QPSK Coherent Optical Networks", Journal of Lightwave Technology, IEEE Service Center, New York, NY, US, vol. 31, No. 21, Nov. 1, 2013, pp. 3352-3360, XP011528717.

* cited by examiner

FIG.20

| IDLER FREQUENCY BAND | AFTER CHANGE | | | | | |
|---|---|---|---|---|---|---|
| (BEFORE INCREASE OR CHANGE IN ARRANGEMENT) | LESS THAN 12.5 GHz | LESS THAN 25 GHz | LESS THAN 50 GHz | LESS THAN 100 GHz | LESS THAN 150 GHz | 150 GHz OR MORE |
| LESS THAN 12.5 GHz | NO CORRECTION | 3 dB | 4 dB | 4 dB | 5 dB | 5 dB |
| LESS THAN 25 GHz | -3 dB | NO CORRECTION | 1 dB | 1.5 dB | 2 dB | 2.5 dB |
| LESS THAN 50 GHz | -4 dB | -1 dB | NO CORRECTION | 0.5 dB | 1 dB | 1 dB |
| LESS THAN 100 GHz | -4 dB | -1.5 dB | -0.5 dB | NO CORRECTION | NO CORRECTION | NO CORRECTION |
| LESS THAN 150 GHz | -5 dB | -2 dB | -1 dB | NO CORRECTION | NO CORRECTION | NO CORRECTION |
| 150 GHz OR MORE | -5 dB | -2.5 dB | -1 dB | NO CORRECTION | NO CORRECTION | NO CORRECTION |

FIG.22

| TRANSMISSION PATH INPUT POWER | AFTER CHANGE | | | | | | |
|---|---|---|---|---|---|---|---|
| (BEFORE CHANGE) | -1.5 dBm/ch | -1 dBm/ch | -0.5 dBm/ch | 0 dBm/ch | 0.5 dBm/ch | 1 dBm/ch |
| -1.5 dBm/ch | NO CORRECTION | NO CORRECTION | NO CORRECTION | -1 dB | -2.5 dB | -5 dB |
| -1 dBm/ch | NO CORRECTION | NO CORRECTION | NO CORRECTION | -1 dB | -2 dB | -5 dB |
| -0.5 dBm/ch | NO CORRECTION | NO CORRECTION | NO CORRECTION | -0.5 dB | -1.5 dB | -4 dB |
| 0 dBm/ch | 1 dB | 1 dB | 0.5 dB | NO CORRECTION | -1 dB | -4 dB |
| 0.5 dBm/ch | 2.5 dB | 2 dB | 1.5 dB | 1 dB | NO CORRECTION | -3 dB |
| 1 dBm/ch | 5 dB | 5 dB | 4 dB | 4 dB | 3 dB | NO CORRECTION |

| ch NUMBER (36A) | TRANSMISSION END NODE (36B) | RECEPTION END NODE (36C) | RELAY NODE (36D) |
|---|---|---|---|
| ch 1 | NODE #7 | NODE #3 | NODE #2 |
| ch 2 | NODE #6 | NODE #3 | NODE #1, 2 |
| ch 3 | NODE #6 | NODE #1 | NODE #2 |
| ⋮ | ⋮ | ⋮ | ⋮ |
| ch x | NODE #1 | NODE #3 | NODE #2 |
| ⋮ | ⋮ | ⋮ | ⋮ |

# NETWORK CONTROL APPARATUS AND TRANSMISSION QUALITY MARGIN CALCULATION METHOD

CROSS-REFERENCE TO RELATED APPLICATION

This application is based upon and claims the benefit of priority of the prior Japanese Patent Application No. 2016-083995, filed on Apr. 19, 2016, the entire contents of which are incorporated herein by reference.

FIELD

The embodiments discussed herein are related to a network control apparatus and a transmission quality margin calculation method.

BACKGROUND

System design of an optical communication network is performed before operation of communication service, based on preset system conditions, such as fiber parameters, the signal modulation format, the bit rate, and the fiber input light power.

A system transmitting high-density wavelength division multiplex signal light requires prior design to deal with dynamic path switching in operation, wavelength increase, and change in the modulation method, in addition to consideration of penalty for interference between wavelength signals in transmission. However, in prior design, an excessive margin may cause deterioration in transmission distance and transmission quality of the whole system. For this reason, in the actual situation, there is a demand for operation of a system with a margin suppressed to a minimum and operation of a dynamic optical network.

For this reason, an error vector magnitude (EVM) is measured for each of optical transmission devices in the system, and an electrical signal to noise ratio (ESNR) is acquired from a measurement result. In addition, a method is well known in which an optical signal to noise ratio (OSNR) is calculated from the acquired ESNR, and an OSNR margin is calculated based on the OSNR. A conventional example is described in Japanese Laid-open Patent Publication No. 2015-50600.

However, the case of using an optical transmission device including no function of measuring EVM is also supposed, there are cases where measurement of EVM fails, which causes a problem. Accordingly, in the actual situation, a margin of the transmission quality is not accurately measured.

SUMMARY

According to an aspect of an embodiment, a network control apparatus includes a processor. The processor calculates a first OSNR corresponding to an allowable limit BER from an OSNR-BER characteristic of a loopback transmission end in a node of a transmission end that transmits a wavelength signal. The processor acquires a reception BER of a reception end node receiving the wavelength signal, and calculates a second OSNR corresponding to the reception BER from the OSNR-BER characteristic of the transmission end. The processor calculates a first noise intensity corresponding to the allowable limit BER from the first OSNR. The processor calculates a second noise intensity corresponding to the reception BER from the second OSNR. The processor calculates a noise intensity margin, based on the first noise intensity and the second noise intensity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is an explanatory drawing illustrating an example of a correction table according to a third embodiment;

FIG. 22 is an explanatory drawing illustrating an example of a correction table according to a fourth embodiment;

DESCRIPTION OF EMBODIMENTS

Preferred embodiments of the present invention will be explained with reference to accompanying drawings. The present embodiments do not limit the disclosed technique. The embodiments illustrated hereinafter may be properly combined within a range that does not cause contradiction.

[a] First Embodiment

Figure 1:
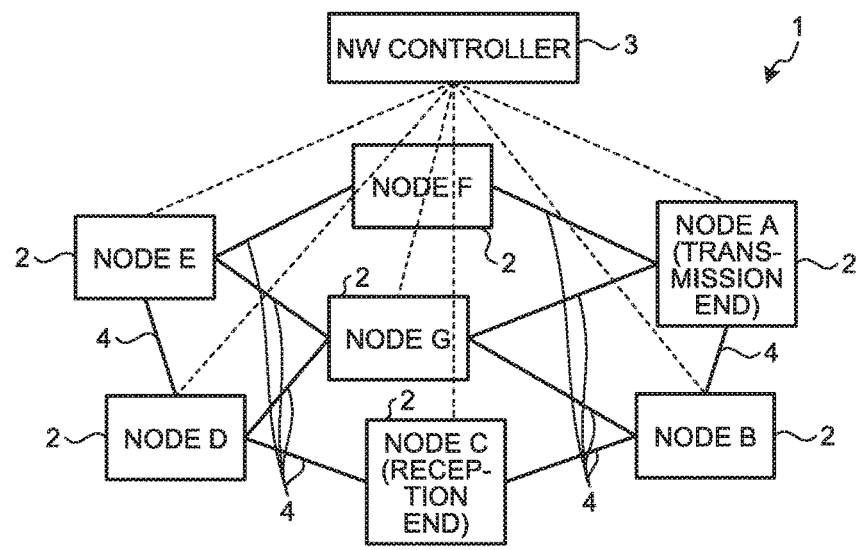
FIG. 1 is an explanatory drawing illustrating an example of an optical transmission system according to a first embodiment.

FIG. 1 is an explanatory drawing illustrating an example of an optical transmission system 1 according to a first embodiment. The optical transmission system 1 illustrated in FIG. 1 includes a plurality of nodes 2, and a network (NW) controller 3. The nodes 2 are, for example, seven optical transmission devices formed of node "A" to node "G" that are connected to perform communications through optical fibers 4. Each node 2 is, for example, a color-less direction-less (CD) reconfigurable optical add-drop multiplexer (ROADM) or a color-less direction less contention-less (CDC) ROADM. For the sake of convenience of explanation, the number of nodes 2 is set to seven, but the number is not limited thereto. The number of nodes 2 may properly be changed. The optical transmission system 1 is, for example, a wavelength multiplexing optical transmission system in which a plurality of optical wavelength paths are multiplexed.

The NW controller 3 is a device collecting various types of information, such as signal quality, of each of the nodes 2 in the optical transmission system 1. The NW controller 3 is a device calculating an amplified spontaneous emission (ASE) noise margin from a bit error rate (BER) in operation.

Figure 2:
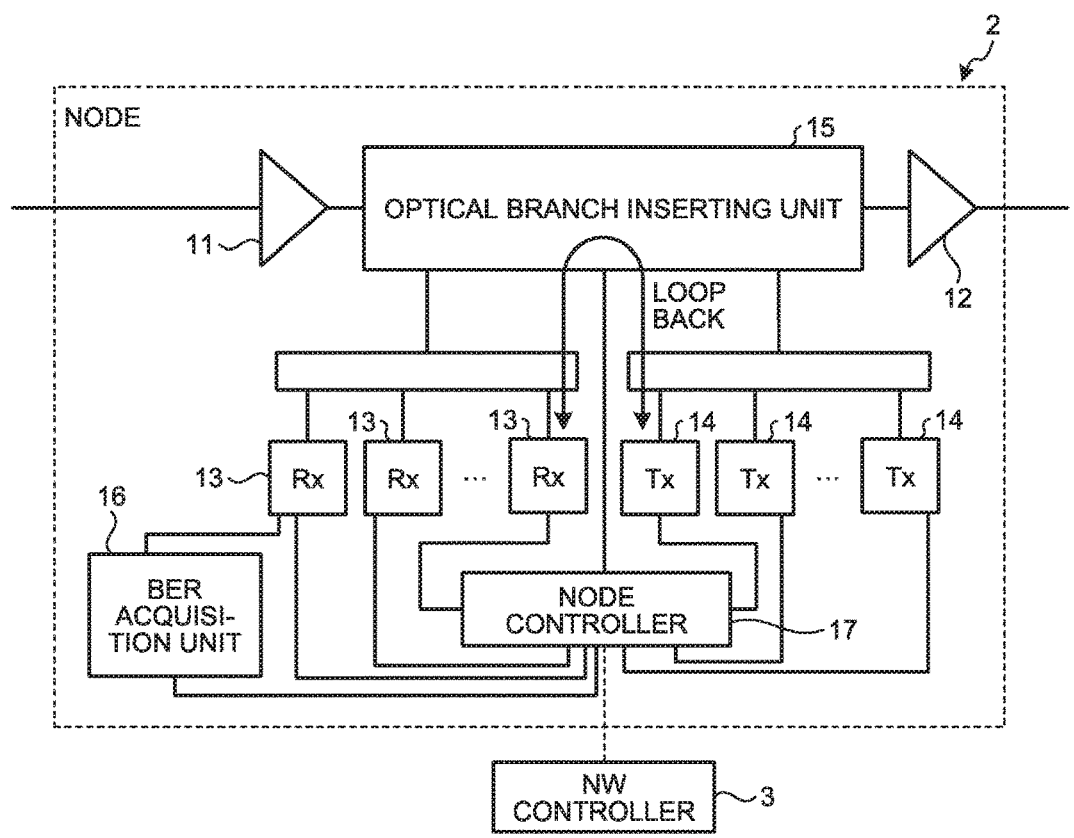
FIG. 2 is a block diagram illustrating an example of hardware configuration of a node according to the first embodiment.

FIG. 2 is an explanatory drawing illustrating an example of hardware configuration of each node 2 in the first embodiment. Each node 2 illustrated in FIG. 2 includes an input amplifier 11, an output amplifier 12, a plurality of receivers (Rx) 13, a plurality of transmitters (Tx) 14, an optical branch inserting unit 15, a BER acquisition unit 16, and a node controller 17. The input amplifier 11 is an optical amplifier amplifying an optical signal input from the optical fiber 4. The output amplifier 12 is an optical amplifier amplifying an optical signal to be output to the optical fiber 4. Each Rx 13 is a receiver receiving an optical signal. Each Tx 14 is a transmitter transmitting an optical signal. The optical branch inserting unit 15 has a function of optically branching part of an optical signal communicated through the wavelength path and optically inserting a new optical signal into the optical signal communicated through the wavelength path, and a function of adjusting the power of the optical signal communicated through the wavelength path. The optical branch inserting unit 15 optically branches an optical signal, and transmits the optically branched optical signal to a certain Rx 13. The optical branch inserting unit 15 optically inserts an optical signal from the Tx 14 into an optical signal, and outputs the optically inserted optical signal to the optical fiber 4 through the output amplifier 12.

The BER acquisition unit 16 measures a BER of the reception path at the Rx 13. The node controller 17 is connected and communicates with the NW controller 3, measures a BER of the wavelength path at the Rx 13, and notifies the NW controller 3 of information including a result of measurement of the BER. The information includes path identification information to identify the wavelength path, and a BER of the wavelength path.

Figure 3:
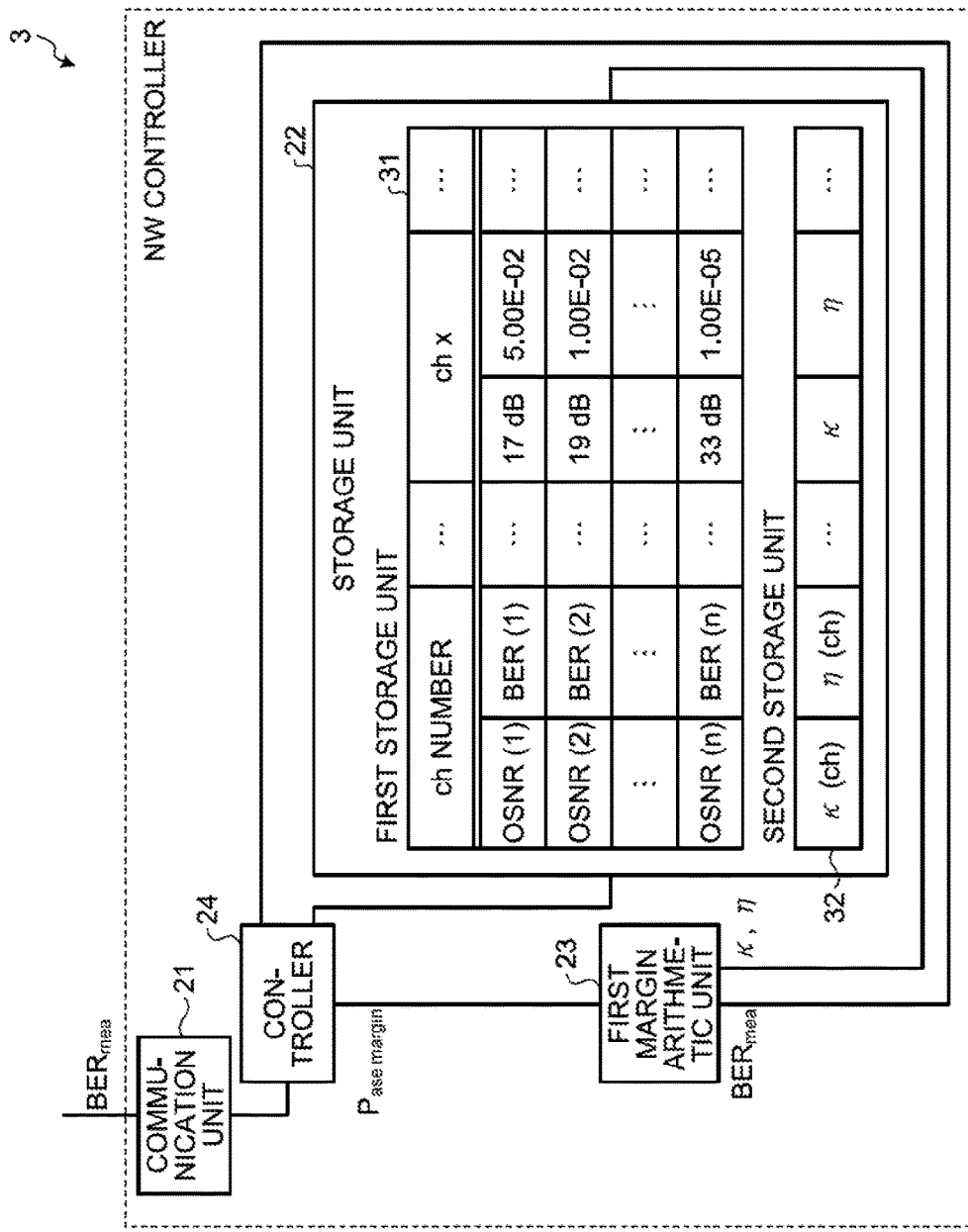
FIG. 3 is an explanatory drawing illustrating an example of a NW controller according to the first embodiment.

FIG. 3 is an explanatory drawing illustrating an example of the NW controller 3 according to the first embodiment. The NW controller 3 illustrated in FIG. 3 includes a communication unit 21, a storage unit 22, a first margin arithmetic unit 23, and a controller 24. The communication unit 21 is a communication interface communicating with each node 2. The storage unit 22 is a region storing various types of information therein. The storage unit 22 includes a first storage unit 31 and a second storage unit 32. The first storage unit 31 serves as a storage unit managing a transmission end OSNR yield strength curve associating the OSNR with the BER. The transmission end OSNR yield strength curve is a curve indicating correspondence relation between BER and OSNR of loopback communication between the Tx 14 and the Rx 13 in the transmission end node 2 of "A", that is, B to B. The second storage unit 32 is a region storing parameters η and κ of the Tx characteristic therein. The first margin arithmetic unit 23 calculates an amplified spontaneous emission (ASE) noise margin $P_{ase\ margin}$ from the transmission end OSNR yield strength curve and the reception $BER_{mea}$ in operation. The reception BER is an actually measured BER measured at the reception end node 2 of "C" receiving a wavelength signal from the transmission end node 2 of "A". The controller 24 controls the whole NW controller 3.

Figure 4:
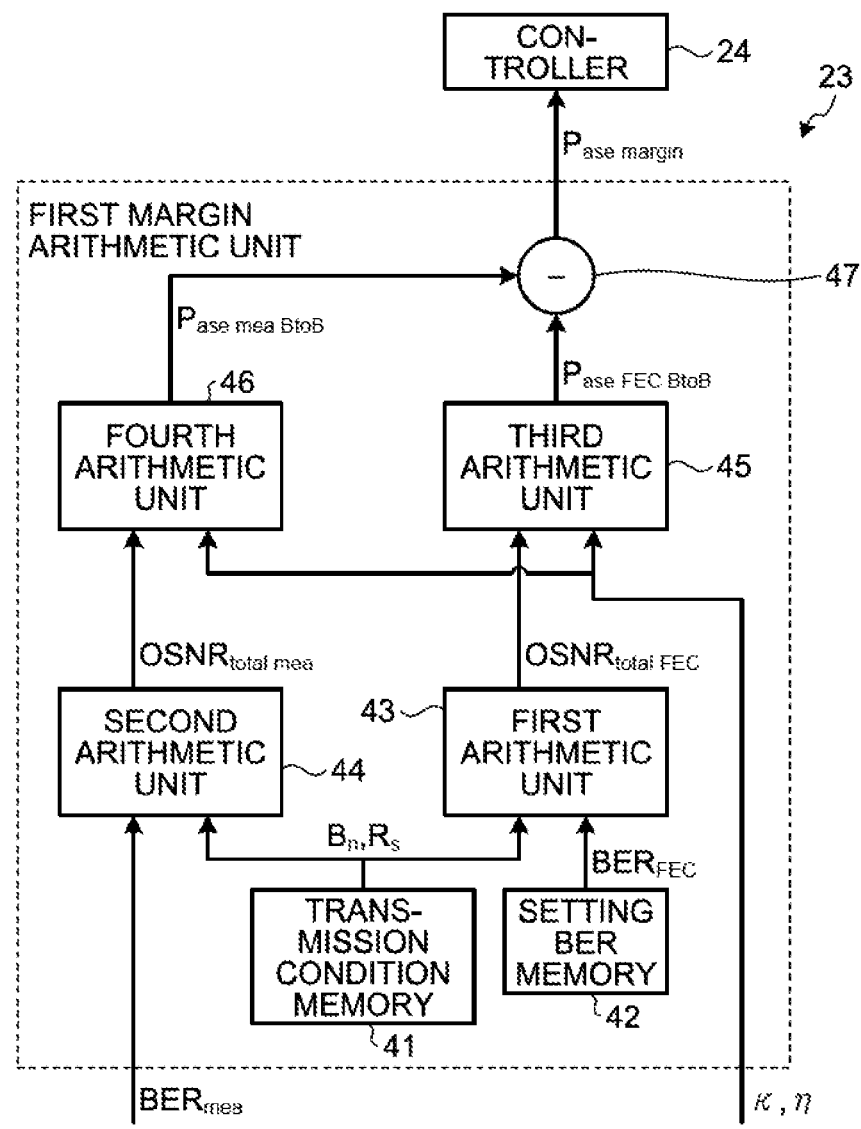
FIG. 4 is an explanatory drawing illustrating an example of a first margin arithmetic unit.

FIG. 4 is an explanatory drawing illustrating an example of the first margin arithmetic unit 23. The first margin arithmetic unit 23 illustrated in FIG. 4 includes a transmission condition memory 41, a setting BER memory 42, a first arithmetic unit 43, a second arithmetic unit 44, a third arithmetic unit 45, a fourth arithmetic unit 46, and a calculator 47. The transmission condition memory 41 stores a noise bandwidth $B_n$ and a signal symbol rate $R_s$ therein. The setting BER memory 42 stores a $BER_{FEC}$ serving as an allowable limit of the optical transmission system 1 therein. The $BER_{FEC}$ of the allowable limit is a BER serving as a limit allowable in the optical transmission system 1.

The first arithmetic unit 43 calculates $OSNR_{total\ FEC}$ by substituting a noise bandwidth $B_n$, a signal symbol rate $R_s$, and a $BER_{FEC}$ of the allowable limit for symbols in Numerical Expression (1). Numerical Expression (1) is applicable to the case where the modulation method is quadrature phase shift keying (QPSK).

$$BER_{FEC} = \frac{1}{2} \text{erfc}\left(\sqrt{\frac{OSNR_{total\,FEC} \cdot B_n}{2R_s}}\right) \quad (1)$$

$$\begin{pmatrix} B_n: \text{Noise Bandwidth} \\ R_s: \text{Signal Symbol Rate} \end{pmatrix}$$

The second arithmetic unit 44 calculates $OSNR_{total\,mea}$ by substituting the noise bandwidth $B_n$, the signal symbol rate $R_s$, and the reception $BER_{mea}$ for the symbols in Numerical Expression (2). Numerical Expression (2) is also applicable to the case where the modulation method is quadrature phase shift keying (QPSK).

$$BER_{mea} = \frac{1}{2} \text{erfc}\left(\sqrt{\frac{OSNR_{total\,mea} \cdot B_n}{2R_s}}\right) \quad (2)$$

The third arithmetic unit 45 calculates ASE noise intensity $P_{ase\,FEC\,BtoB}$ by substituting the $OSNR_{total\,FEC}$ from the first arithmetic unit 43, and the parameters $\eta$ and $\kappa$ of the Tx characteristic for the symbols in Numerical Expression (3). For the ASE noise intensity $P_{ase\,FEC\,BtoB}$, Numerical Expression (4) is established based on the relation with the ASE noise intensity $P_{ase\,FEC\,trans}$ in operation and nonlinear noise intensity $P_{NLI}$.

$$OSNR_{total\,FEC} = \kappa \frac{P_{sig}}{P_{ase\,FEC\,BtoB} + \eta} = \kappa \frac{P_{sig}}{P_{ase\,FEC\,trans} + P_{NLI} + \eta} \quad (3)$$

$$\begin{pmatrix} P_{sig}: \text{Signal Light Intensity,} \\ P_{ase}: \text{ASE Noise Intensity,} \\ P_{NLI}: \text{Nonlinear Noise Intensity,} \\ \kappa, \eta: \text{Transmitter Characteristic Parameters} \end{pmatrix}$$

$$P_{ase\,FEC\,BtoB} = P_{ase\,FEC\,trans} + P_{NLI} \quad (4)$$

The fourth arithmetic unit 46 calculates the ASE noise intensity $P_{ase\,mea\,BtoB}$, by substituting the $OSNR_{total\,mea}$ from the second arithmetic unit 44, and the parameters $\eta$ and $\kappa$ of the Tx characteristic for the symbols in Numerical Expression (5). For the ASE noise intensity $P_{ase\,mea\,BtoB}$, Numerical Expression (6) is established based on the relation with the ASE noise intensity $P_{ase\,mea\,trans}$ in operation and nonlinear noise intensity $P_{NLI}$.

$$OSNR_{total\,mea} = \kappa \frac{P_{sig}}{P_{ase\,mea\,BtoB} + \eta} = \kappa \frac{P_{sig}}{P_{ase\,mea\,trans} + P_{NLI} + \eta} \quad (5)$$

$$P_{ase\,mea\,BtoB} = P_{ase\,mea\,trans} + P_{NLI} \quad (6)$$

The calculator 47 subtracts the ASE noise intensity $P_{ase\,mea\,BtoB}$ calculated in the fourth arithmetic unit 46 from the ASE noise intensity $P_{ase\,FEC\,BtoB}$ calculated in the third arithmetic unit 45, and calculates a subtraction result as the ASE noise margin $P_{ase\,margin}$. For the ASE noise margin $P_{ase\,margin}$, Numerical Expression (7) is established, and consequently Numerical Expression (8) is obtained.

$$P_{ase\,FEC\,BtoB} - P_{ase\,mea\,BtoB} = P_{ase\,FEC\,trans} - P_{ase\,mea\,trans} \quad (7)$$
$$= P_{ase\,margin}$$

$$P_{ase\,margin} = \frac{P_{sig}OSNR_{total\,FEC}}{\kappa - \eta OSNR_{total\,FEC}} - \frac{P_{sig}OSNR_{total\,mea}}{\kappa - \eta OSNR_{total\,mea}} \quad (8)$$

Figure 5:
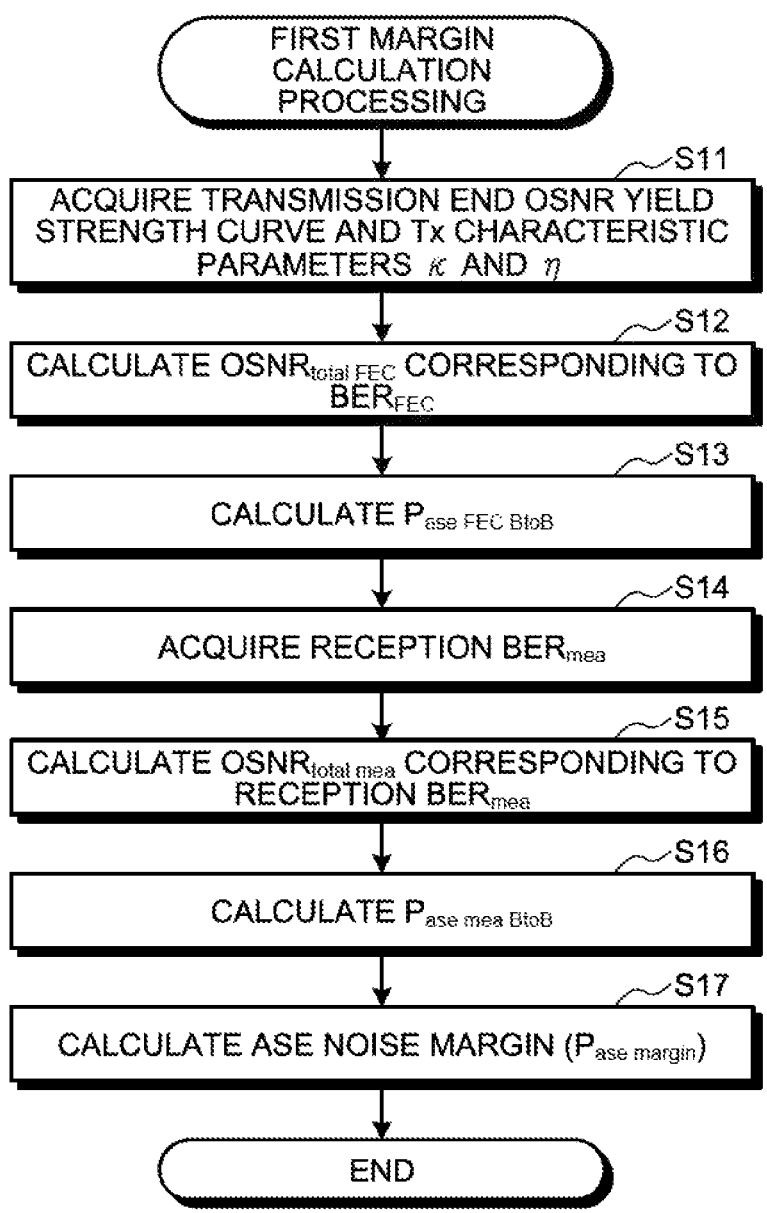
FIG. 5 is a flowchart illustrating an example of processing operations of the first margin arithmetic unit in the NW controller relating to first margin calculation processing.

The following is an explanation of operations of the NW controller 3 according to the first embodiment. FIG. 5 is a flowchart illustrating an example of processing operations of the first margin arithmetic unit 23 in the NW controller 3 relating to first margin calculation processing.

Figure 6:
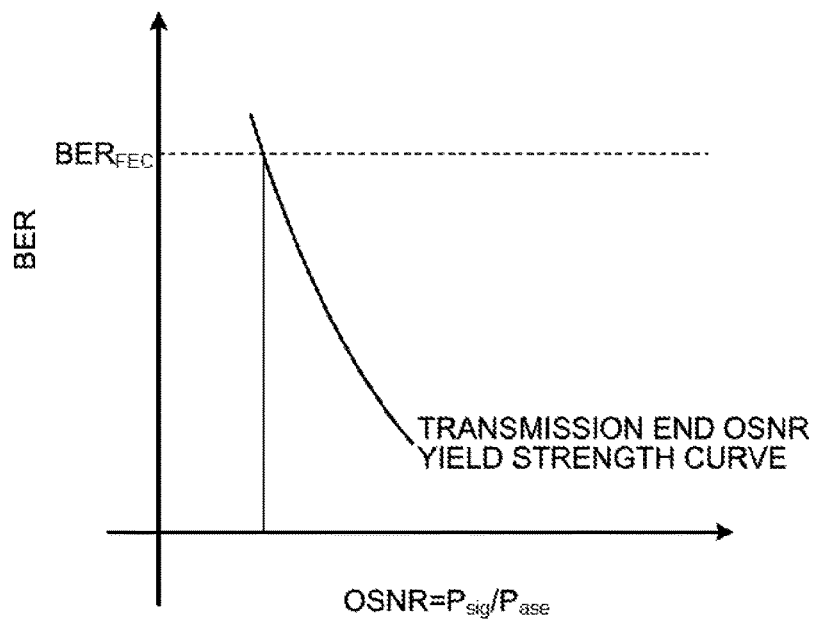
FIG. 6 is an explanatory drawing illustrating an example of a transmission end OSNR yield strength curve on a BER-OSNR characteristic.

In FIG. 5, the first margin arithmetic unit 23 acquires the transmission end OSNR yield strength curve from the first storage unit 31, and acquires the Tx characteristic parameters $\eta$ and $\kappa$ from the second storage unit 32 (Step S11). FIG. 6 is an explanatory drawing illustrating an example of a transmission end OSNR yield strength curve on a BER-OSNR characteristic. In the BER-OSNR characteristic, the vertical axis indicates BER, and the horizontal axis indicates OSNR. The characteristic illustrated in FIG. 6 illustrates the transmission end OSNR yield strength curve and $BER_{FEC}$.

Figure 7:
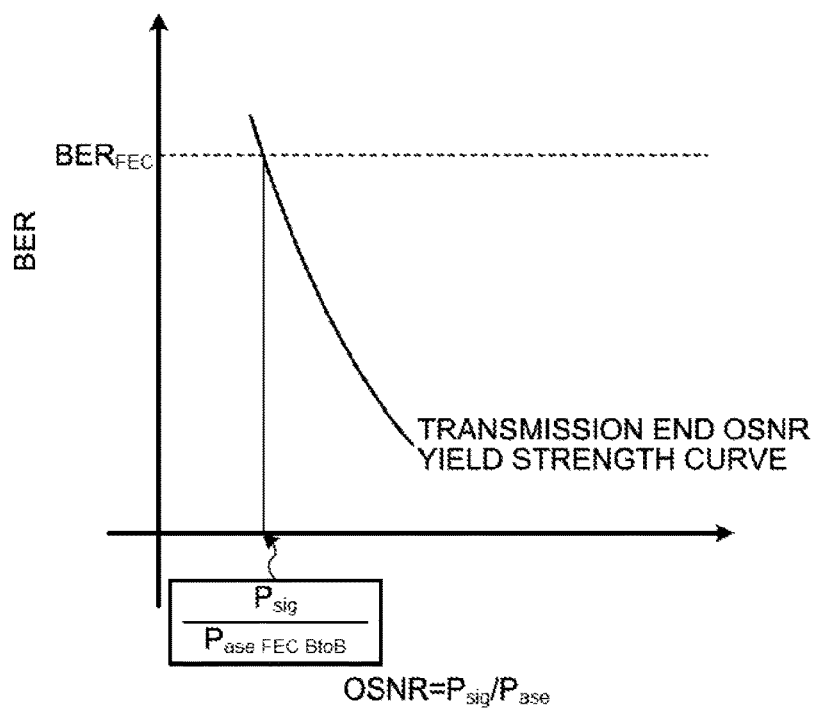
FIG. 7 is an explanatory drawing illustrating an example of $OSNR_{total\ FEC}$ corresponding to $BER_{FEC}$ on the BER-OSNR characteristic.

The first arithmetic unit 43 in the first margin arithmetic unit 23 reads a $BER_{FEC}$ of the allowable limit from the setting BER memory 42, and substitutes the noise bandwidth $B_n$, the signal symbol rate $R_s$, and $BER_{fec}$ for the symbols of Numerical Expression (1). The first arithmetic unit 43 calculates $OSNR_{total\,FEC}$ corresponding to $BER_{FEC}$ (Step S12). FIG. 7 is an explanatory drawing illustrating an example of $OSNR_{total\,FEC}$ corresponding to $BER_{FEC}$ on the BER-OSNR characteristic. The $P_{sig}/P_{ase\,FEC\,BtoB}$ illustrated in FIG. 7 is $OSNR_{total\,FEC}$ corresponding to $BER_{FEC}$.

The third arithmetic unit 45 in the first margin arithmetic unit 23 calculates ASE noise intensity $P_{ase\,FEC\,BtoB}$ from $OSNR_{total\,FEC}$ (Step S13).

Figure 8:
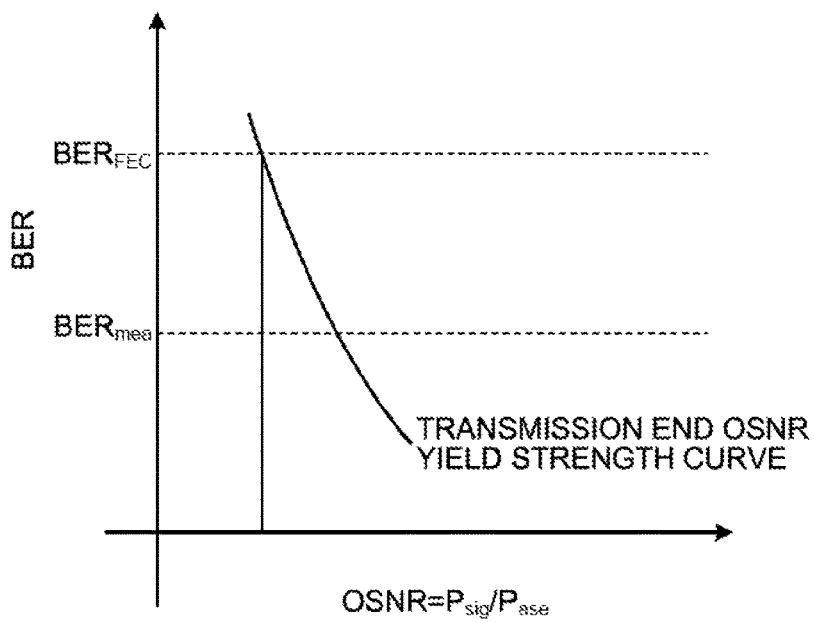
FIG. 8 is an explanatory drawing illustrating an example of reception $BER_{mea}$ in operation on the BER-OSNR characteristic.

The second arithmetic unit 44 in the first margin arithmetic unit 23 acquires reception $BER_{mea}$ in operation of the reception end node 2 (Step S14). The reception $BER_{mea}$ of the reception end node 2 is a reception BER in operation that is measured by the reception end node 2. FIG. 8 is an explanatory drawing illustrating an example of the reception $BER_{mea}$ in operation on the BER-OSNR characteristic. The characteristic illustrated in FIG. 8 illustrates the reception $BER_{mea}$ in operation.

The second arithmetic unit 44 substitutes the noise bandwidth $B_n$, the signal symbol rate $R_s$, and the reception $BER_{mea}$ for the symbols in Numerical Expression (2), and calculates $OSNR_{total\,mea}$ corresponding to the reception $BER_{mea}$ in operation (Step S15).

Figure 9:
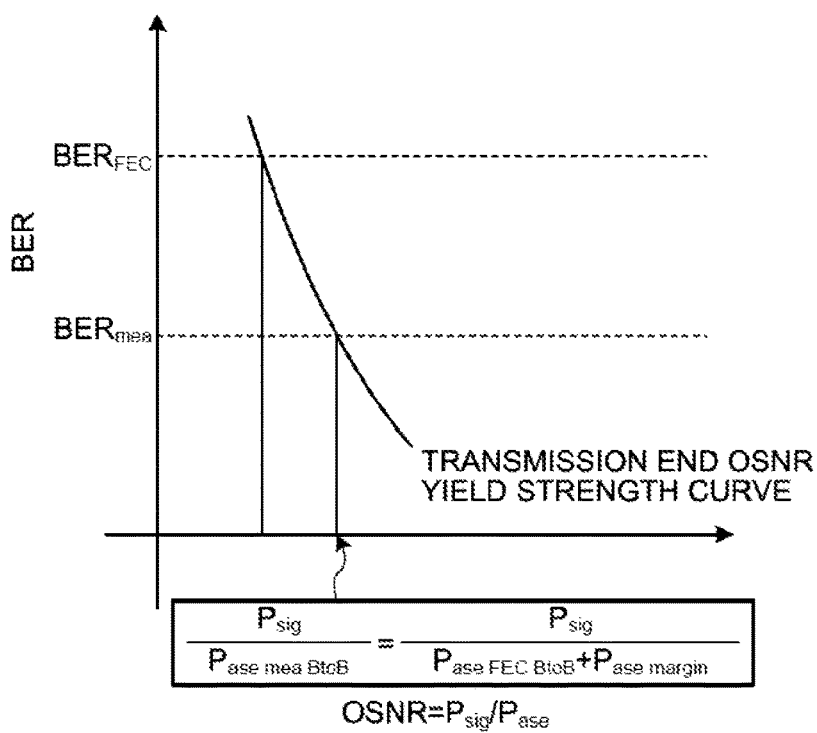
FIG. 9 is an explanatory drawing illustrating an example of $OSNR_{total\ mea}$ corresponding to reception $BER_{mea}$ in operation on the BER-OSNR characteristic.

The fourth arithmetic unit 46 in the first margin arithmetic unit 23 substitutes the $OSNR_{total\,mea}$ from the second arithmetic unit 44 and the Tx characteristic parameters $\eta$ and $\kappa$ for the symbols in Numerical Expression (5), to calculate ASE noise intensity $P_{ase\,mea\,BtoB}$ (Step S16). FIG. 9 is an explanatory drawing illustrating an example of $OSNR_{total\,mea}$ corresponding to the reception $BER_{mea}$ on the BER-OSNR characteristic. The $P_{sig}/P_{ase\,mea\,BtoB}$ illustrated in FIG. 9 is $OSNR_{total\,mea}$ corresponding to $BER_{mea}$.

Figure 10:
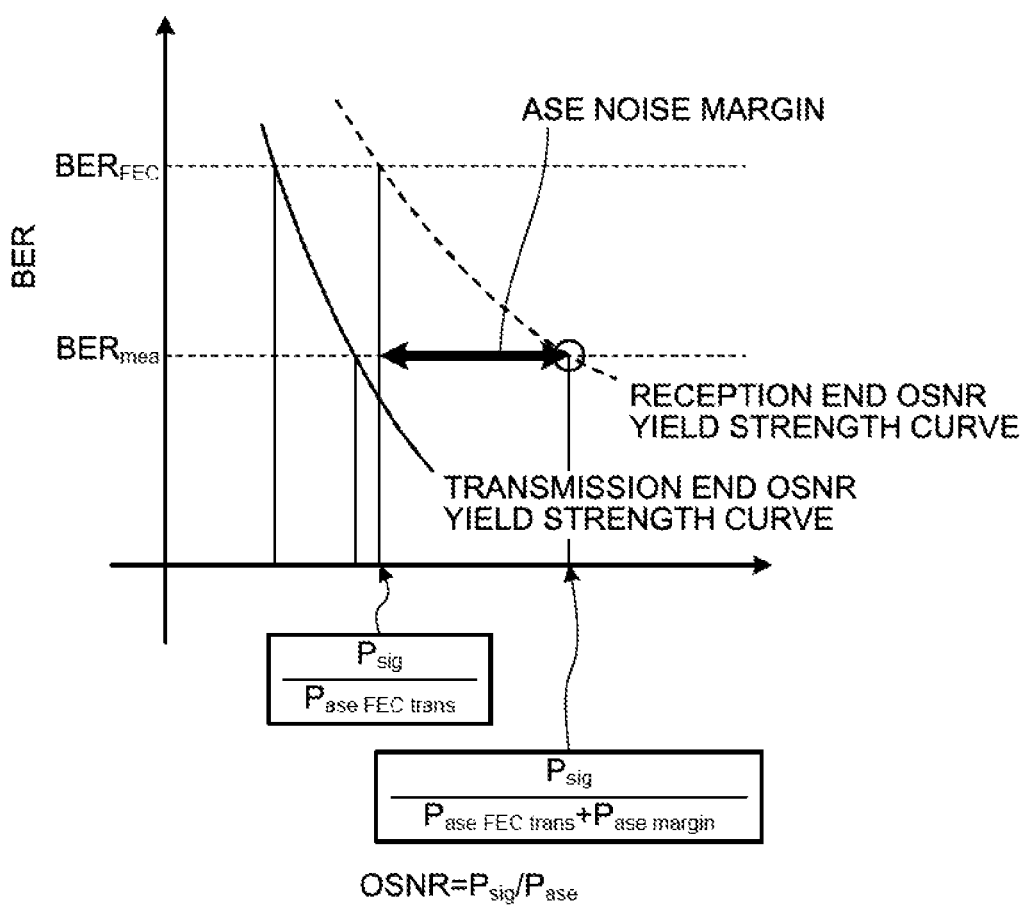
FIG. 10 is an explanatory drawing illustrating an example of ASE noise margin $P_{ase\ margin}$ in operation on the BER-OSNR characteristic.

The calculator 47 in the first margin arithmetic unit 23 calculates an ASE noise margin $P_{ase\,margin}$ (Step S17) based on the ASE noise intensity $P_{ase\,FEC\,BtoB}$ and ASE noise intensity $P_{ase\,mea\,BtoB}$, and ends the processing operations illustrated in FIG. 5. FIG. 10 is an explanatory drawing illustrating an example of the ASE noise margin $P_{ase\,margin}$ in operation on the BER-OSNR characteristic. The characteristic illustrated in FIG. 10 illustrates the ASE noise margin $P_{ase\ margin}$. The reception end OSNR yield strength curve is a curve of a BER-OSNR characteristic of the node 2 of the reception end in operation.

The NW controller 3 in the first embodiment calculates an $OSNR_{total\ FEC}$ corresponding to the allowable limit $BER_{FEC}$ from the transmission end OSNR yield strength curve, and calculates an $OSNR_{total\ mea}$ corresponding to the reception $BER_{mea}$ from the transmission end OSNR yield strength curve. The NW controller 3 calculates ASE noise intensity $P_{ase\ FEC\ BtoB}$ from the $OSNR_{total\ FEC}$, and calculates ASE noise intensity $P_{ase\ mea\ BtoB}$ from the $OSNR_{total\ mea}$. The NW controller 3 subtracts the ASE noise intensity $P_{ase\ mea\ BtoB}$ from the ASE noise intensity $P_{ase\ FEC\ BtoB}$ and calculates a subtraction result as the ASE noise margin $P_{ase\ margin}$. Consequently, an ASE noise margin is calculated with high accuracy from the reception BER.

The NW controller 3 in the first embodiment described above acquires the reception $BER_{mea}$ in operation from the reception end node 2. The following is an explanation of an embodiment serving as a second embodiment, in the case where a reception OSNR is acquired from the reception end node 2, as well as the reception $BER_{mea}$ in operation. Constituent elements that are the same as those of the optical transmission system 1 according to the first embodiment will be denoted by the same reference numerals as those of the first embodiment, and the explanation of overlapping structures and operations will be omitted.

[b] Second Embodiment

Figure 11:
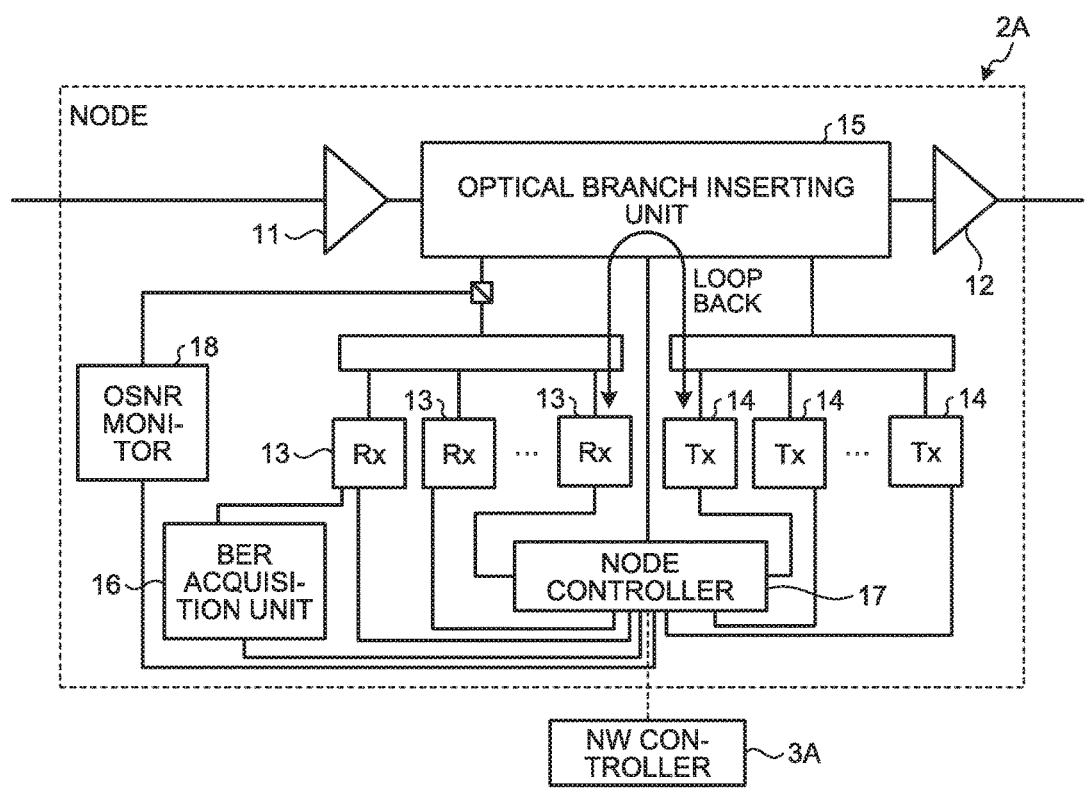
FIG. 11 is a block diagram illustrating an example of hardware configuration of a node according to a second embodiment.

FIG. 11 is a block diagram illustrating an example of hardware configuration of a node 2A according to a second embodiment. The node 2A illustrated in FIG. 11 is different from the node 2 illustrated in FIG. 2, in that the node 2A includes an OSNR monitor 18. The node 2A acquires a reception $BER_{mea}$ of the reception end with the BER acquisition unit 16, and acquires a reception $OSNR_1$ of the reception end with the OSNR monitor 18. In addition, the node controller 17 notifies a NW controller 3A of the acquired reception $BER_{mea}$ of the reception end node 2A and the acquired reception $OSNR_1$ of the reception end node 2A.

Figure 12:
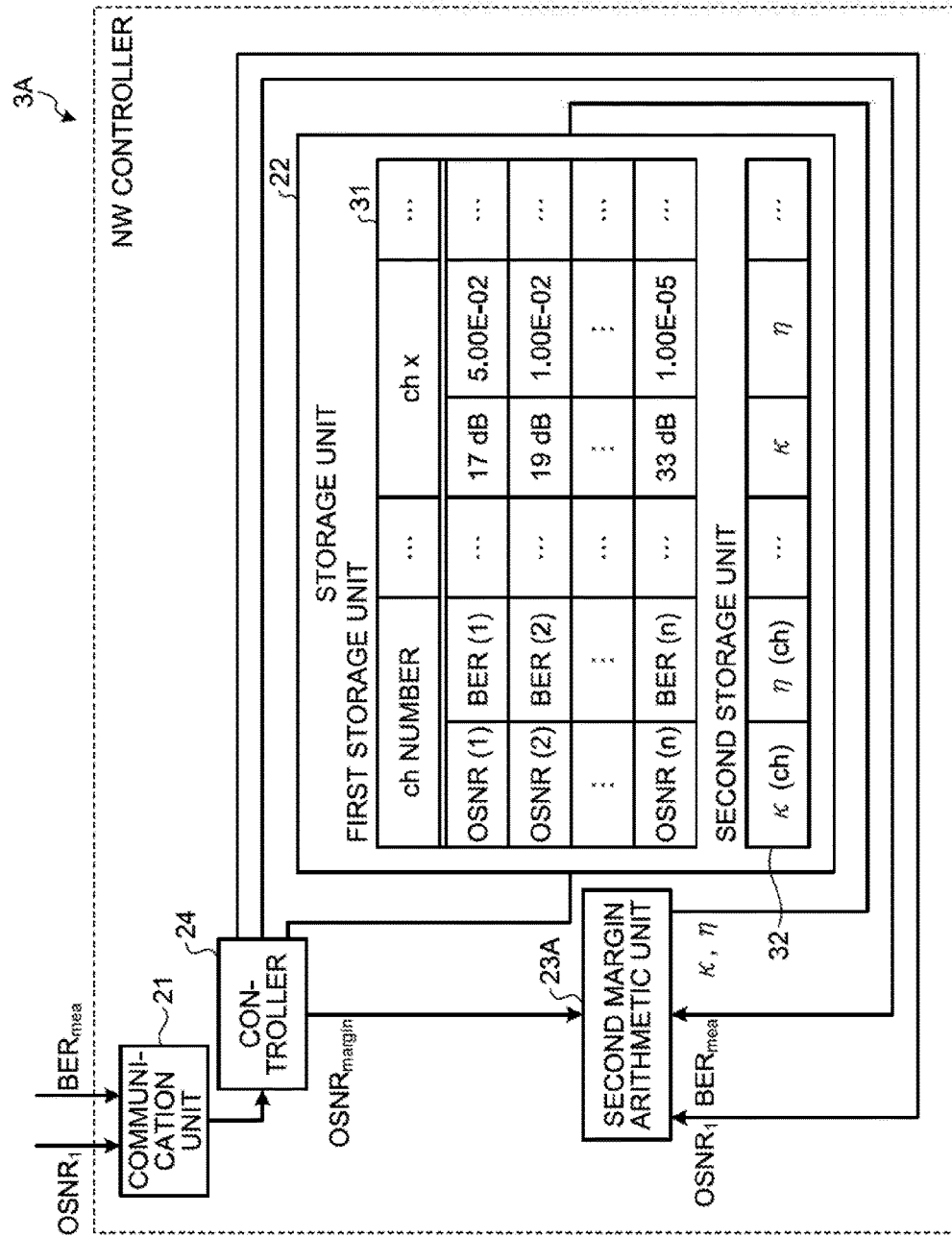
FIG. 12 is an explanatory drawing illustrating an example of the NW controller according to the second embodiment.

FIG. 12 is an explanatory drawing illustrating an example of the NW controller 3A according to the second embodiment. The NW controller 3A illustrated in FIG. 12 is different from the NW controller 3 illustrated in FIG. 3, in that the NW controller 3A includes a second margin arithmetic unit 23A calculating an OSNR margin $OSNR_{margin}$, based on the reception $BER_{mea}$ acquired from the reception end node 2A and the reception $OSNR_1$ of the reception end node 2A.

Figure 13:
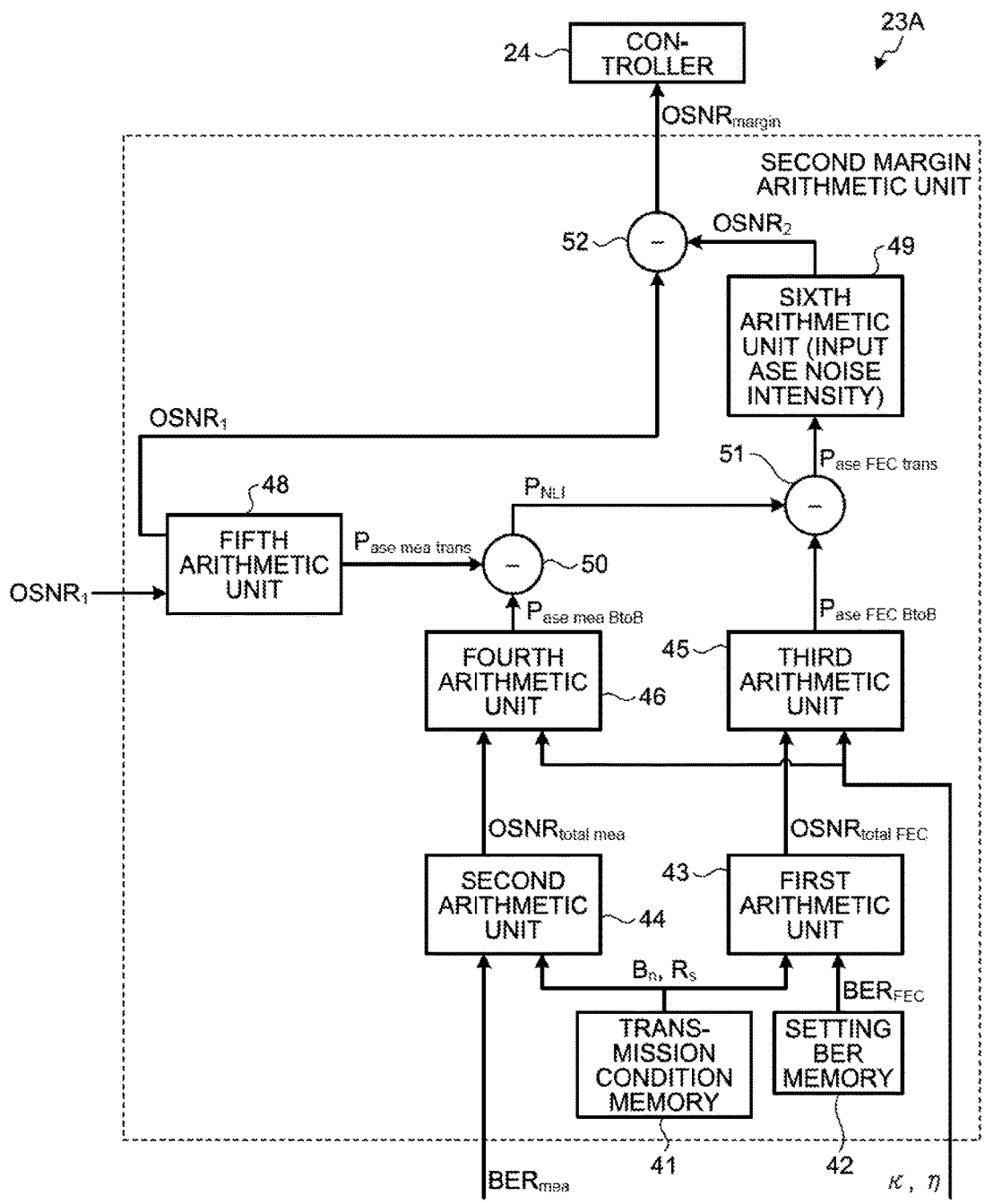
FIG. 13 is an explanatory drawing illustrating an example of a second margin arithmetic unit.

FIG. 13 is an explanatory drawing illustrating an example of the second margin arithmetic unit 23A. The second margin arithmetic unit 23A illustrated in FIG. 13 further includes a fifth arithmetic unit 48, a sixth arithmetic unit 49, a first calculator 50, a second calculator 51, and a third calculator 52.

The fifth arithmetic unit 48 acquires the reception $OSNR_1$, and substitutes the acquired reception $OSNR_1$ for the symbol in Numerical Expression (9), to calculate ASE noise intensity $P_{ase\ mea\ trans}$.

$$OSNR_1 = \frac{P_{sig}}{P_{ase\ mea\ trans}} \qquad (9)$$

The first calculator 50 subtracts the ASE noise intensity $P_{ase\ mea\ BtoB}$ calculated in the fourth arithmetic unit 46 from the ASE noise intensity $P_{ase\ mea\ trans}$ calculated in the fifth arithmetic unit 48, based on Numerical Expression (10), to calculate nonlinear noise intensity $P_{NLI}$. The first calculator 50 inputs the calculated nonlinear noise intensity $P_{NLI}$ to the second calculator 51.

$$\begin{aligned} P_{ase\ FEC\ trans} &= P_{ase\ FEC\ BtoB} - P_{NLI} \\ &= P_{ase\ FEC\ BtoB} - (P_{ase\ mea\ BtoB} - P_{ase\ mea\ trans}) \\ &= \frac{P_{sig} OSNR_{total\ FEC}}{\kappa - \eta OSNR_{total\ FEC}} - \frac{P_{sig} OSNR_{total\ mea}}{\kappa - \eta OSNR_{total\ mea}} + \\ &\quad P_{ase\ mea\ trans} \end{aligned} \qquad (10)$$

The second calculator 51 subtracts the nonlinear noise intensity $P_{NLI}$ calculated in the first calculator 50 from the ASE noise intensity $P_{ase\ FEC\ BtoB}$ calculated in the third arithmetic unit 45, to calculate ASE noise intensity $P_{ase\ FEC\ trans}$. The second calculator 51 also inputs the calculated ASE noise intensity $P_{ase\ FEC\ trans}$ to the sixth arithmetic unit 49. The sixth arithmetic unit 49 calculates $OSNR_2$ corresponding to the setting $BER_{FEC}$ in operation from the ASE noise intensity $P_{ase\ FEC\ trans}$, and inputs the calculated $OSNR_2$ to the third calculator 52.

The third calculator 52 subtracts the $OSNR_2$ calculated in the sixth arithmetic unit 49 from the reception $OSNR_1$ calculated with the fifth arithmetic unit 48, based on Numerical Expression (11), to calculate the OSNR margin $OSNR_{margin}$. The third calculator 52 inputs the calculated $OSNR_{margin}$ to the controller 24.

$$OSNR_{margin} = OSNR_1 - OSNR_2 = OSNR_1 - \frac{P_{sig}}{P_{ase\ FEC\ trans}} \qquad (11)$$

Figure 14:
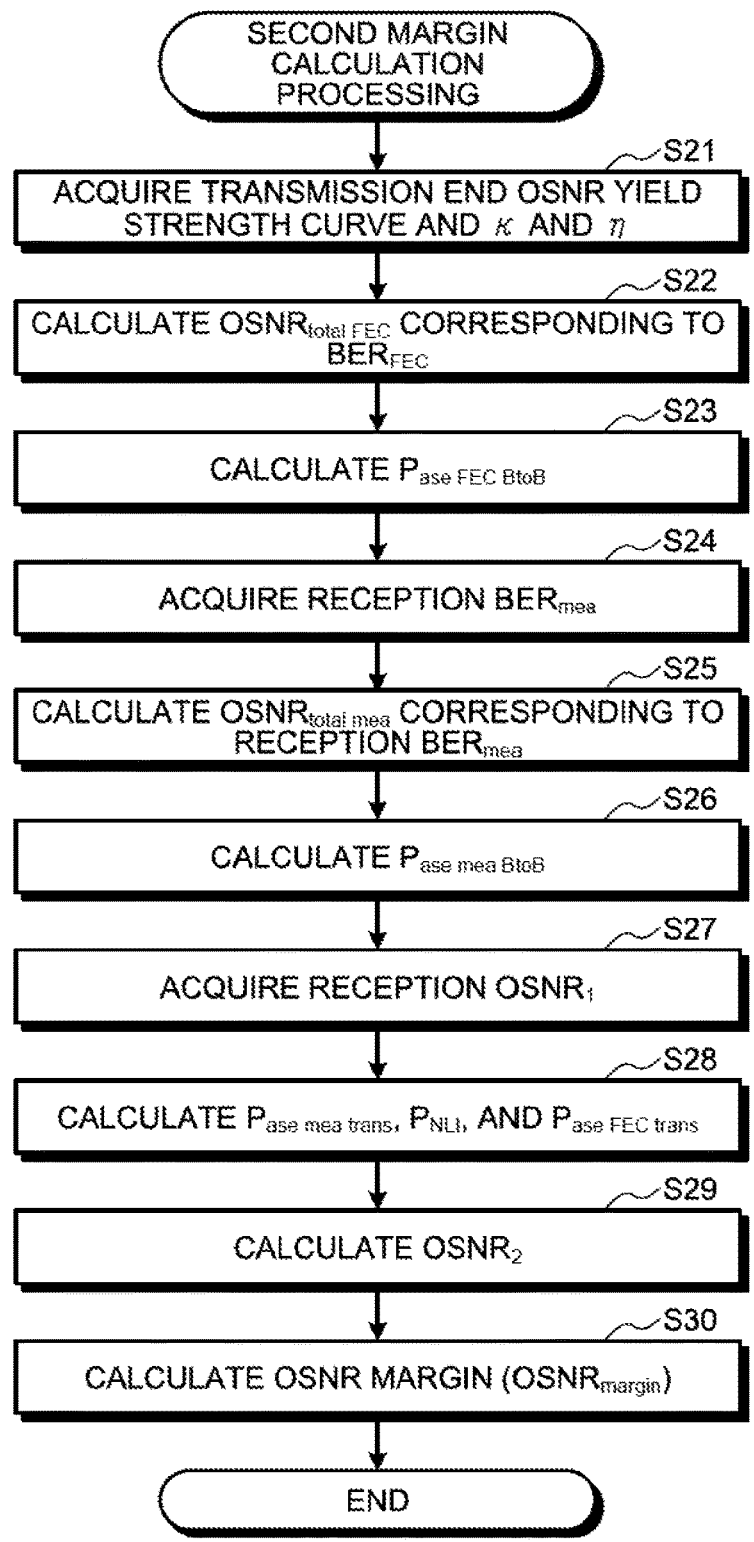
FIG. 14 is a flowchart illustrating an example of processing operations of the second margin arithmetic unit in the NW controller relating to second margin calculation processing.

The following is an explanation of operations of the NW controller 3A according to the second embodiment. FIG. 14 is a flowchart illustrating an example of processing operations of the second margin arithmetic unit 23A in the NW controller 3A relating to second margin calculation processing.

In FIG. 14, the second margin arithmetic unit 23A acquires the transmission end OSNR yield strength curve from the first storage unit 31, and acquires the Tx characteristic parameters $\eta$ and $\kappa$ from the second storage unit 32 (Step S21). The first arithmetic unit 43 in the second margin arithmetic unit 23A reads the $BER_{FEC}$ from the setting BER memory 42, and substitutes the noise bandwidth $B_n$, the signal symbol rate $R_s$, and $BER_{FEC}$ for the symbols in Numerical Expression (1), based on Numerical Expression (1). The first arithmetic unit 43 calculates an $OSNR_{total\ FEC}$ corresponding to the $BER_{FEC}$ (Step S22).

The third arithmetic unit 45 in the second margin arithmetic unit 23A calculates ASE noise intensity $P_{ase\ FEC\ BtoB}$ from the $OSNR_{total\ FEC}$ (Step S23). The second arithmetic unit 44 in the second margin arithmetic unit 23A acquires the reception $BER_{mea}$ in operation of the reception end node (Step S24). The second arithmetic unit 44 substitutes the noise bandwidth $B_n$, the signal symbol rate $R_s$, and the reception $BER_{mea}$ for the symbols in Numerical Expression (2), to calculate an $OSNR_{total\ mea}$ corresponding to the reception $BER_{mea}$ in operation (Step S25). In addition, the fourth arithmetic unit 46 in the second margin arithmetic unit 23A calculates ASE noise intensity $P_{ase\ mea\ BtoB}$ from $OSNR_{total\ mea}$ (Step S26).

Figure 15:
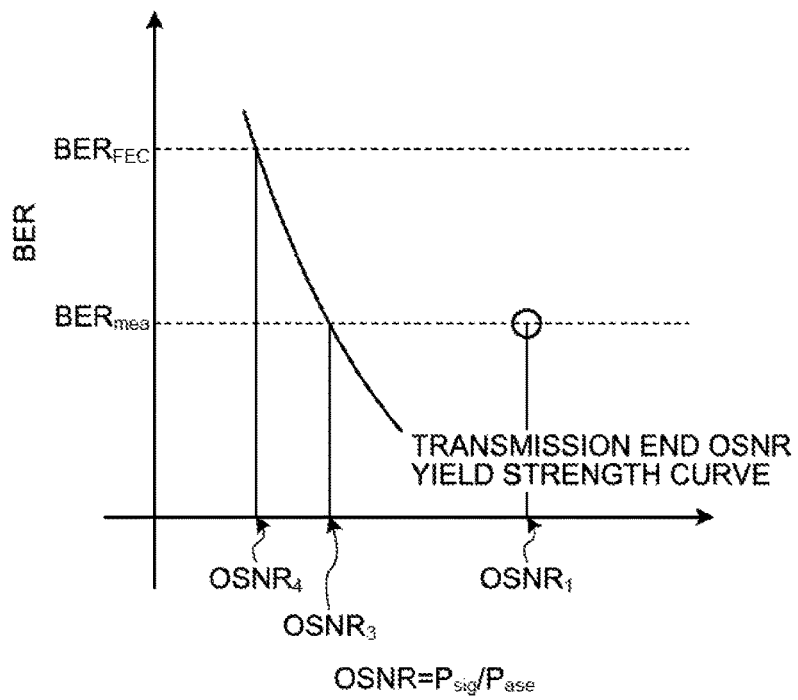
FIG. 15 is an explanatory drawing illustrating an example of reception $OSNR_1$ in operation on the BER-OSNR characteristic.
Figure 16:
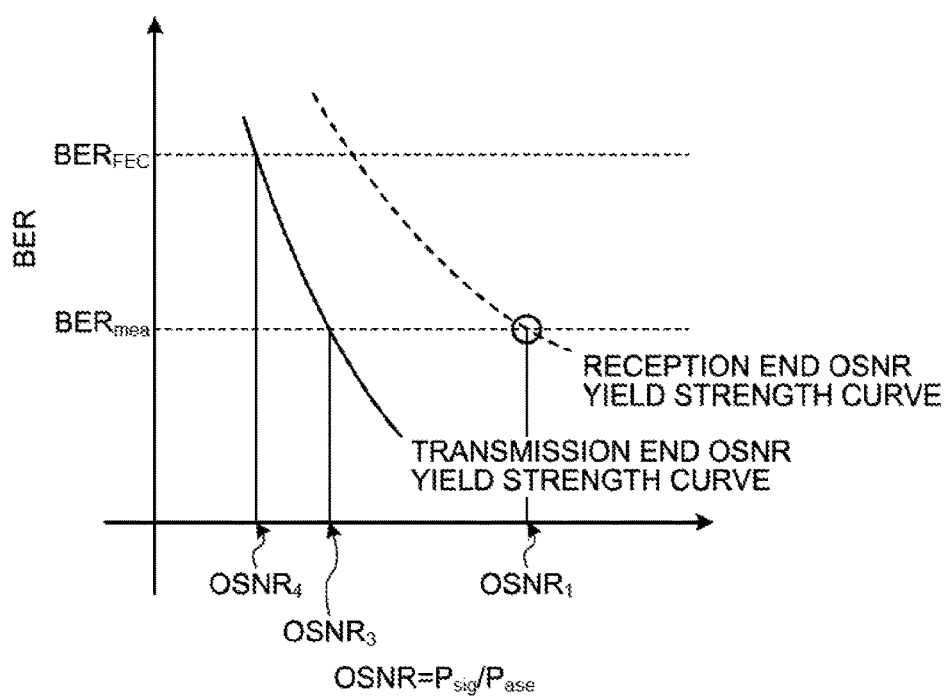
FIG. 16 is an explanatory drawing illustrating an example of an OSNR yield strength curve in operation on the BER-OSNR characteristic.

The fifth arithmetic unit 48 in the second margin arithmetic unit 23A acquires a reception $OSNR_1$ of the reception end node 2 (Step S27). FIG. 15 is an explanatory drawing illustrating an example of the reception $OSNR_1$ in operation on a BER-OSNR characteristic. The characteristic illustrated in FIG. 15 illustrates the reception $OSNR_1$ corresponding to the reception $BER_{mea}$ in operation. The fifth arithmetic unit 48 calculates ASE noise intensity $P_{ase\ mea\ trans}$, nonlinear noise intensity $P_{NLI}$, and ASE noise intensity $P_{ase\ FEC\ trans}$ from the reception $OSNR_1$ of the reception end node 2 (Step S28). The fifth arithmetic unit 48 calculates an OSNR yield strength curve in operation, based on the ASE noise intensity $P_{ase\ mea\ trans}$ nonlinear noise intensity $P_{NLI}$, and ASE noise intensity $P_{ase\ FEC\ trans}$. FIG. 16 is an explanatory drawing illustrating an example of the OSNR yield strength curve in operation on a BER-OSNR characteristic. The characteristic illustrated in FIG. 16 illustrates a reception end OSNR yield strength curve in operation in the node 2 of the reception end.

Figure 17:
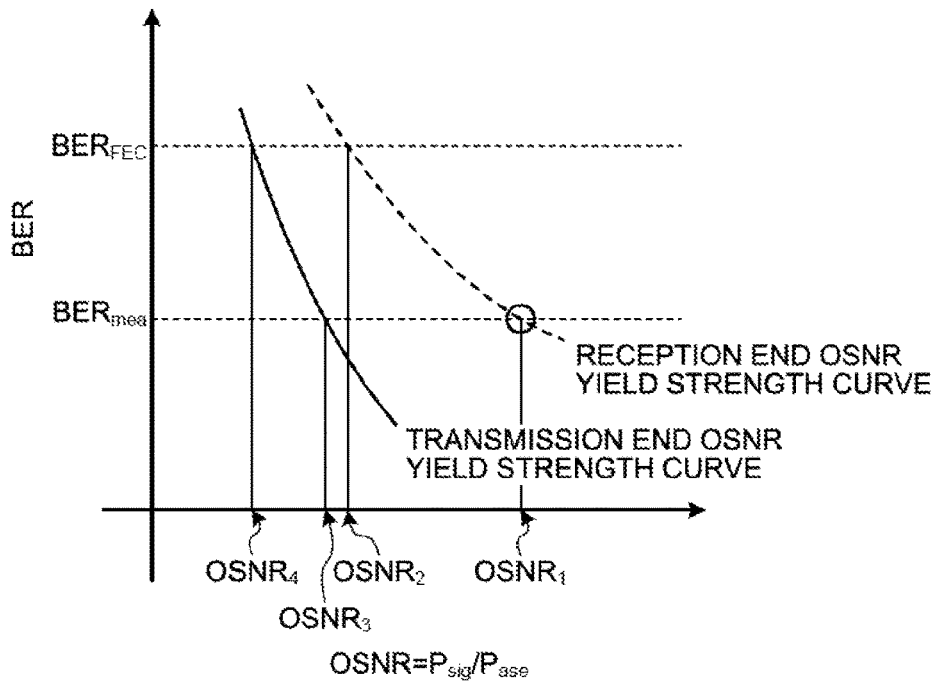
FIG. 17 is an explanatory drawing illustrating an example of $OSNR_2$ on an OSNR yield strength curve in operation on the BER-OSNR characteristic.

The sixth arithmetic unit 49 in the second margin arithmetic unit 23A calculates an $OSNR_2$ from the ASE noise intensity $P_{ase\ FEC\ trans}$ (Step S29). FIG. 17 is an explanatory drawing illustrating an example of the $OSNR_2$ on the OSNR yield strength curve in operation on the BER-OSNR characteristic. The characteristic illustrated in FIG. 17 illustrates the $OSNR_2$ on the OSNR yield strength curve in operation.

Figure 18:
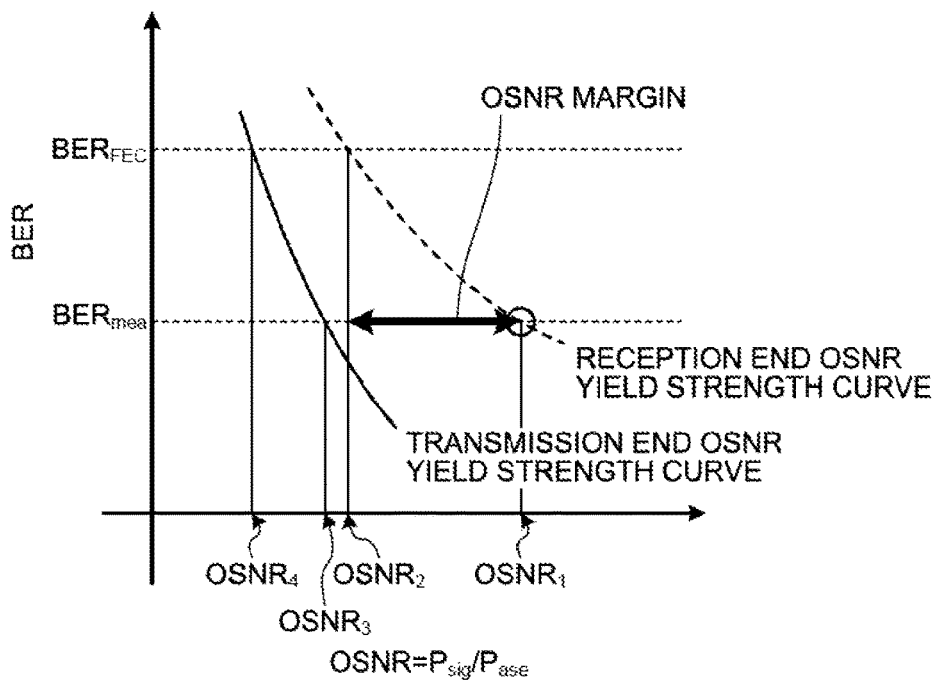
FIG. 18 is an explanatory drawing illustrating an example of an OSNR margin $OSNR_{margin}$ in operation on the BER-OSNR characteristic.

The third calculator 52 in the second margin arithmetic unit 23A subtracts the $OSNR_2$ from the reception $OSNR_1$ from the fifth arithmetic unit 48 to calculate an $OSNR_{margin}$ (Step S30), and ends the processing operations illustrated in FIG. 14. FIG. 18 is an explanatory drawing illustrating an example of the OSNR margin $OSNR_{margin}$ in operation on a BER-OSNR characteristic. The characteristic illustrated in FIG. 18 illustrates the OSNR margin $OSNR_{margin}$.

The NW controller 3A of the second embodiment calculates an $OSNR_{total\ FEC}$ corresponding to the allowable limit $BER_{FEC}$ from the transmission end OSNR yield strength curve, and calculates an $OSNR_{total\ mea}$ corresponding to the reception $BER_{mea}$ from the transmission end OSNR yield strength curve. The NW controller 3A calculates ASE noise intensity $P_{ase\ FEC\ BtoB}$ from the $OSNR_{total\ FEC}$, and calculates ASE noise intensity $P_{ase\ mea\ BtoB}$ from the $OSNR_{total\ mea}$. The NW controller 3A acquires a result of measurement of the reception $OSNR_1$ corresponding to the reception $BER_{mea}$, and calculates ASE noise intensity $P_{ase\ mea\ trans}$ from the acquired reception $OSNR_1$, to calculate nonlinear noise intensity $P_{NLI}$ from the ASE noise intensity $P_{ase\ mea\ trans}$. The NW controller 3A subtracts the nonlinear noise intensity $P_{NLI}$ from the ASE noise intensity $P_{ase\ FEC\ BtoB}$, to calculate ASE noise intensity $P_{ase\ FEC\ trans}$. In addition, the NW controller 3A calculates an $OSNR_2$ from the ASE noise intensity $P_{ase\ FEC\ trans}$ and subtracts the $OSNR_2$ from the reception $OSNR_1$, to calculate an $OSNR_{margin}$. This structure enables calculation of an OSNR margin $OSNR_{margin}$ with high accuracy from the reception BER measured at the reception end node 2 and the reception $OSNR_1$.

The NW controller 3A according to the second embodiment described above calculates an OSNR margin $OSNR_{margin}$ using nonlinear noise intensity $P_{NLI}$ when a measurement wavelength signal (channel) is disposed in an idler frequency band in the signal spectrum. However, the nonlinear noise intensity changes when a wavelength is increased or wavelength arrangement is changed. For this reason, to deal with such a situation, an embodiment will be explained hereinafter as a third embodiment. In the third embodiment, the OSNR margin $OSNR_{margin}$ is corrected in accordance with a change amount of an idler frequency band of the measurement wavelength signal from an adjacent wavelength signal.

[c] Third Embodiment

Figure 19:
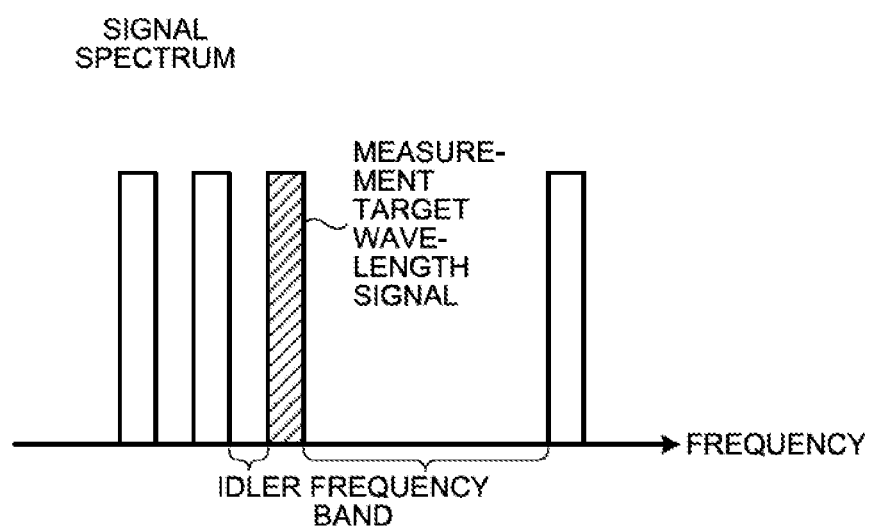
FIG. 19 is an explanatory drawing illustrating an example of relation between a measurement target wavelength signal and adjacent wavelength signals.

FIG. 19 is an explanatory drawing illustrating an example of relation between a measurement target wavelength signal and adjacent wavelength signals. The measurement target wavelength signal is a signal serving as a target for which an OSNR margin is to be calculated. The nonlinear noise intensity changes in accordance with a change amount of the idler frequency band between the measurement target wavelength signal and an adjacent wavelength signal adjacent to the measurement target wavelength signal in the signal spectrum. Accordingly, the OSNR margin $OSNR_{margin}$ is corrected in accordance with the change amount of the idler frequency band between the measurement target wavelength signal and the adjacent wavelength signal.

The controller 24 in the NW controller 3A refers to a correction table 61, to correct the OSNR margin $OSNR_{margin}$ calculated with the second margin arithmetic unit 23A. FIG. 20 is an explanatory drawing illustrating an example of the correction table 61 according to the third embodiment. The correction table 61 illustrated in FIG. 20 manages correction values to correct the OSNR margin $OSNR_{margin}$ for each of an idler frequency band 61A before change and an idler frequency band 61B after change.

For example, in the case where the idler frequency band 61A before change is less than 12.5 GHz, no correction value is applied when the idler frequency band 61B after change is less than 12.5 GHz, and a correction value is 3 dB when the idler frequency band 61B after change is less than 25 GHz. In addition, a correction value is 4 dB when the idler frequency band 61B after change is less than 50 GHz or less than 100 GHz, and a correction value is 5 dB when the idler frequency band 61B after change is less than 150 GHz or equal to or higher than 150 GHz.

For example, in the case where the idler frequency band 61A before change is less than 25 GHz, a correction value is −3 dB when the idler frequency band 61B after change is less than 12.5 GHz, and no correction value is applied when the idler frequency band 61B after change is less than 25 GHz. In addition, a correction value is 1 dB when the idler frequency band 61B after change is less than 50 GHz, a correction value is 1.5 dB when the idler frequency band 61B after change is less than 100 GHz, and a correction value is 2 dB when the idler frequency band 61B after change is less than 150 GHz. A correction value is 2.5 dB when the idler frequency band 61B after change is 150 GHz or more.

In the case where the idler frequency band 61A before change is less than 50 GHz, a correction value is −4 dB when the idler frequency band 61B after change is less than 12.5 GHz, and a correction value is −1 dB when the idler frequency band 61B after change is less than 25 GHz. In addition, no correction value is applied when the idler frequency band 61B after change is less than 50 GHz, a correction value is 0.5 dB when the idler frequency band 61B after change is less than 100 GHz, and a correction value is 1 dB when the idler frequency band 61B after change is less than 150 GHz. A correction value is 1 dB when the idler frequency band 61B after change is 150 GHz or more.

In the case where the idler frequency band 61A before change is less than 100 GHz, a correction value is −4 dB when the idler frequency band 61B after change is less than 12.5 GHz, and a correction value is −1.5 dB when the idler frequency band 61B after change is less than 25 GHz. In addition, a correction value is −0.5 dB when the idler frequency band 61B after change is less than 50 GHz, and no correction value is applied when the idler frequency band 61B after change is less than 100 GHz, less than 150 GHz, or 150 GHz or more.

Figure 21:
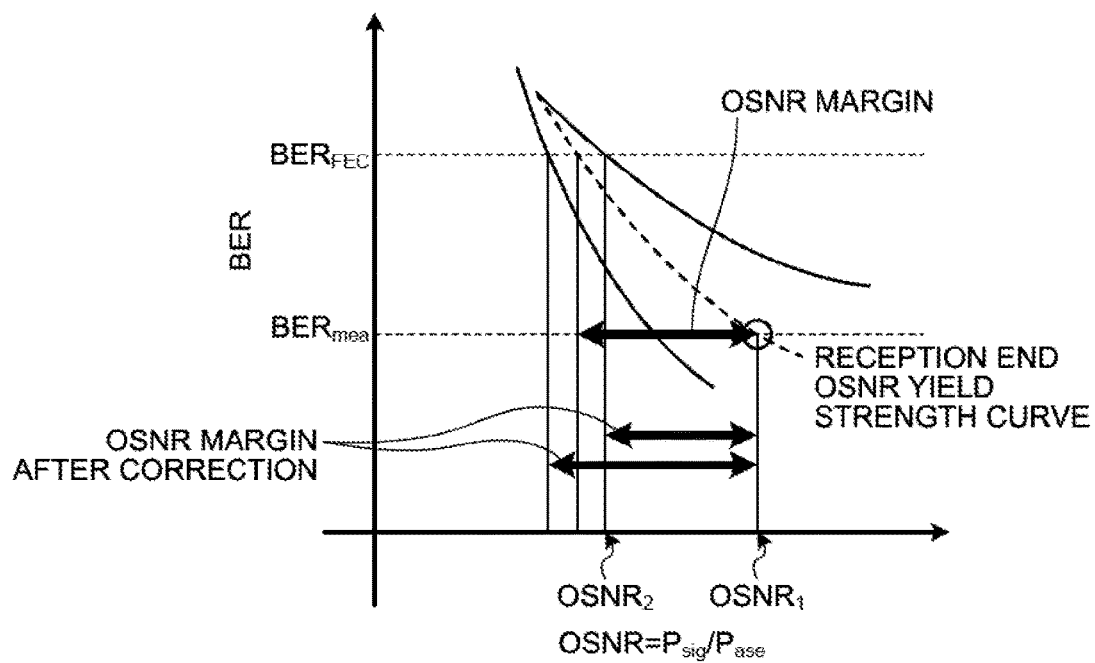
FIG. 21 is an explanatory drawing illustrating an example of an OSNR margin $OSNR_{margin}$ before and after correction according to the third embodiment.

When the OSNR margin $OSNR_{margin}$ is calculated in the second margin arithmetic unit 23A, the controller 24 acquires a correction value from the correction table 61, in accordance with the idler frequency band 61A before change and the idler frequency band 61B after change. FIG. 21 is an explanatory drawing illustrating an example of the OSNR margin $OSNR_{margin}$ before and after correction according to the third embodiment. In addition, the controller 24 corrects the OSNR margin $OSNR_{margin}$ as illustrated in FIG. 20, based on the acquired correction value.

The NW controller 3A according to the third embodiment acquires a correction value corresponding to idler frequency band amounts before and after change, and corrects the OSNR margin $OSNR_{margin}$, based on the acquired correction value. This structure enables provision of an OSNR margin $OSNR_{margin}$ in consideration of nonlinear noise intensity fluctuating in accordance with the idler frequency band amount of the measurement target wavelength signal.

The NW controller 3A according to the second embodiment described above calculates the OSNR margin $OSNR_{margin}$ using the nonlinear noise intensity $P_{NLI}$ when, for example, the measurement target wavelength signal in the signal spectrum is changed. However, the nonlinear noise intensity changes also when the transmission path input power is changed. For this reason, to deal with such a situation, an embodiment will be explained hereinafter as a fourth embodiment. In the embodiment, the OSNR margin $OSNR_{margin}$ is corrected in accordance with a change amount of a transmission path input power of the measurement target wavelength signal.

[d] Fourth Embodiment

Nonlinear noise intensity changes in accordance with a change amount of the transmission path input power between the measurement target wavelength signal and an adjacent wavelength signal adjacent to the measurement target wavelength signal in the signal spectrum. As a result, the OSNR margin $OSNR_{margin}$ is corrected in accordance with the change amount of the transmission path input power of the measurement target wavelength signal.

The controller 24 in the NW controller 3A refers to a correction table 62, to correct the OSNR margin $OSNR_{margin}$ calculated in the second margin arithmetic unit 23A. FIG. 22 is an explanatory drawing illustrating an example of the correction table 62 according to the fourth embodiment.

The correction table 62 illustrated in FIG. 22 manages correction values to correct the OSNR margin $OSNR_{margin}$ for each of a transmission path input power 62A before change and a transmission path input power 62B after change. For example, in the case where the transmission path input power 62A before change is −1.5 dBm/ch, no correction value is applied when the transmission path input power 62B after change is −1.5 dBm/ch, −1 dBm/ch, or −0.5 dBm/ch. A correction value is −1 dB when the transmission path input power 62B after change is 0 dBm/ch, a correction value is −2.5 dB when the transmission path input power 62B after change is 0.5 dBm/ch, and a correction value is −5 dB when the transmission path input power 62B after change is 1 dBm/ch.

For example, in the case where the transmission path input power 62A before change is −1 dBm/ch, no correction value is applied when the transmission path input power 62B after change is −1.5 dBm/ch, −1 dBm/ch, or −0.5 dBm/ch. A correction value is −1 dB when the transmission path input power 62B after change is 0 dBm/ch, a correction value is −2 dB when the transmission path input power 62B after change is 0.5 dBm/ch, and a correction value is −5 dB when the transmission path input power 62B after change is 1 dBm/ch.

For example, in the case where the transmission path input power 62A before change is 0.5 dBm/ch, a correction value is 2.5 dB when the transmission path input power 62B after change is −1.5 dBm/ch, and a correction value is 2 dB when the transmission path input power 62B after change is −1 dBm/ch. A correction value is 1.5 dB when the transmission path input power 62B after change is −0.5 dBm/ch, and a correction value is 1 dB when the transmission path input power 62B after change is 0 dBm/ch. No correction value is applied when the transmission path input power 62B after change is 0.5 dBm/ch, and a correction value is −3 dB when the transmission path input power 62B after change is 1 dBm/ch.

Figure 23:
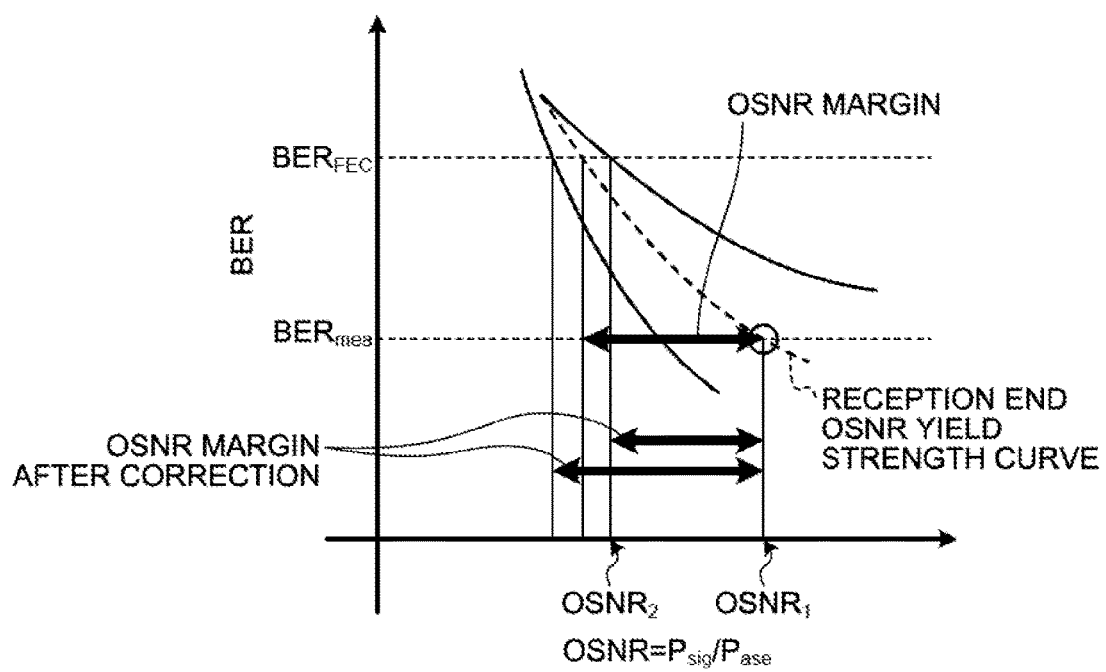
FIG. 23 is an explanatory drawing illustrating an example of an OSNR margin $OSNR_{margin}$ before and after correction according to the fourth embodiment.

When the OSNR margin $OSNR_{margin}$ is calculated in the second margin arithmetic unit 23A, the controller 24 acquires a correction value corresponding to the transmission path input power 62A before change and the transmission path input power 62B after change from the correction table 62. FIG. 23 is an explanatory drawing illustrating an example of the OSNR margin $OSNR_{margin}$ before and after correction according to the fourth embodiment. In addition, the controller 24 corrects the OSNR margin $OSNR_{margin}$ as illustrated in FIG. 23, based on the acquired correction value.

The NW controller 3A according to the fourth embodiment acquires a correction value corresponding to the transmission path input power amounts before and after change, and corrects the OSNR margin $OSNR_{margin}$, based on the acquired correction value. This structure provides an OSNR margin $OSNR_{margin}$ in consideration of nonlinear noise intensity fluctuating in accordance with the transmission input powers of the measurement wavelength signal before and after change.

The NW controller 3A according to the second embodiment described above stores, in the first storage unit 31 in advance, a transmission end OSNR yield strength curve associating the B-to-B BER with OSNR in loopback communication between the Tx 14 and Rx 13 in the transmission end node 2. However, various model numbers exist for the Tx 14 and the Rx 13 in the transmission end node 2, and the transmission end OSNR yield strength curve differs in accordance with a combination of the Tx 14 and the Rx 13 of each model number. For this reason, an embodiment will be explained hereinafter as a fifth embodiment. In the embodiment, a NW controller 3B is capable of a transmission end OSNR yield strength curve in accordance with a combination of the Tx 14 and the Rx 13 of each model number. Constituent elements that are the same as those of the NW controller 3A according to the second embodiment will be denoted by the same reference numerals as those of the second embodiment, and the explanation of overlapping structures and operations will be omitted.

[e] Fifth Embodiment

Figure 24:
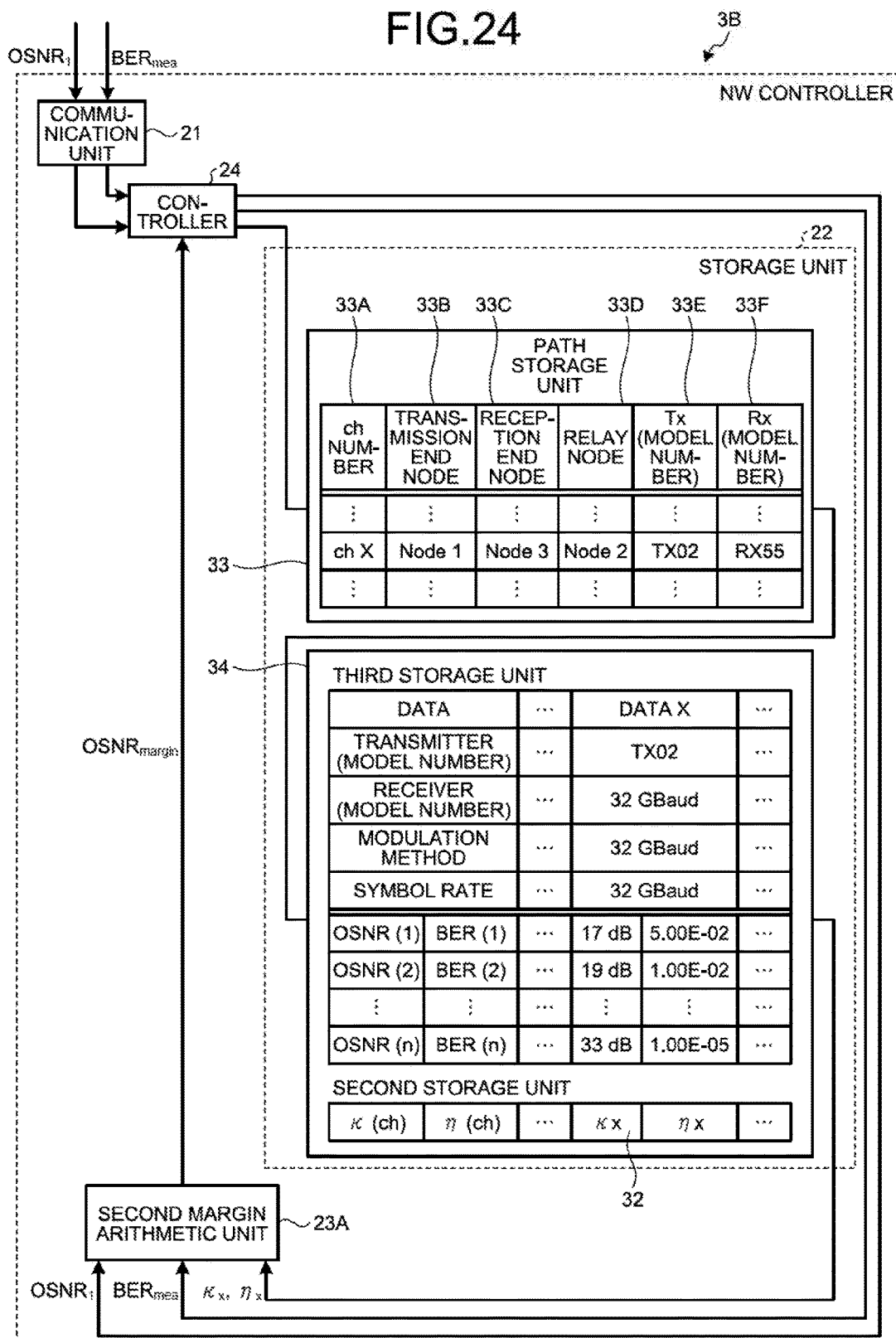
FIG. 24 is an explanatory drawing illustrating an example of the NW controller according to a fifth embodiment.

FIG. 24 is an explanatory drawing illustrating an example of a NW controller 3B according to a fifth embodiment. The NW controller 3B illustrated in FIG. 24 includes the communication unit 21, the second margin arithmetic unit 23A, the controller 24, and the storage unit 22. The storage unit 22 includes a path storage unit 33, and a third storage unit 34, in addition to the second storage unit 32. The path storage unit 33 is a region to manage the transmission end node 33B, the reception end node 33C, the relay node 33D, the model number 33E of the Tx 14, and the model number 33F of the Rx 13 in the transmission end node 2, in association with each ch number 33A to identify the channel of the wavelength signal.

The third storage unit 34 stores therein a transmission end OSNR yield strength curve associating BER with OSNR in accordance with the combination of the model number 33E of the Tx 14 and the model number 33F of the Rx 13.

The controller 24 acquires a transmission end OSNR yield strength curve from the third storage unit 34, in accordance with the combination of the model number 33E of the Tx 14 and the model number 33F of the Rx 13 in the transmission end node 2.

Because the NW controller 3B according to the fifth embodiment acquires a transmission end OSNR yield strength curve in accordance with the combination of the model number 33E of the Tx 14 and the model number 33F of the Rx 13, the NW controller 3B provides various types of transmission end OSNR yield strength curves in accordance with the combination of the model number 33E of the Tx 14 and the model number 33F of the Rx 13.

The NW controller 3 according to the first embodiment described above acquires a transmission end OSNR yield strength curve corresponding to the Tx 14 and the Rx 13 in the transmission end node 2 from the first storage unit 31. However, the structure is not limited to the case of acquiring a transmission end OSNR yield strength curve from the first storage unit 31, but a transmission end OSNR yield strength curve may be acquired through communication between the Tx 14 and the Rx 13 in the transmission end node 2. An embodiment in this case will be explained hereinafter as a sixth embodiment.

[f] Sixth Embodiment

Figure 25:
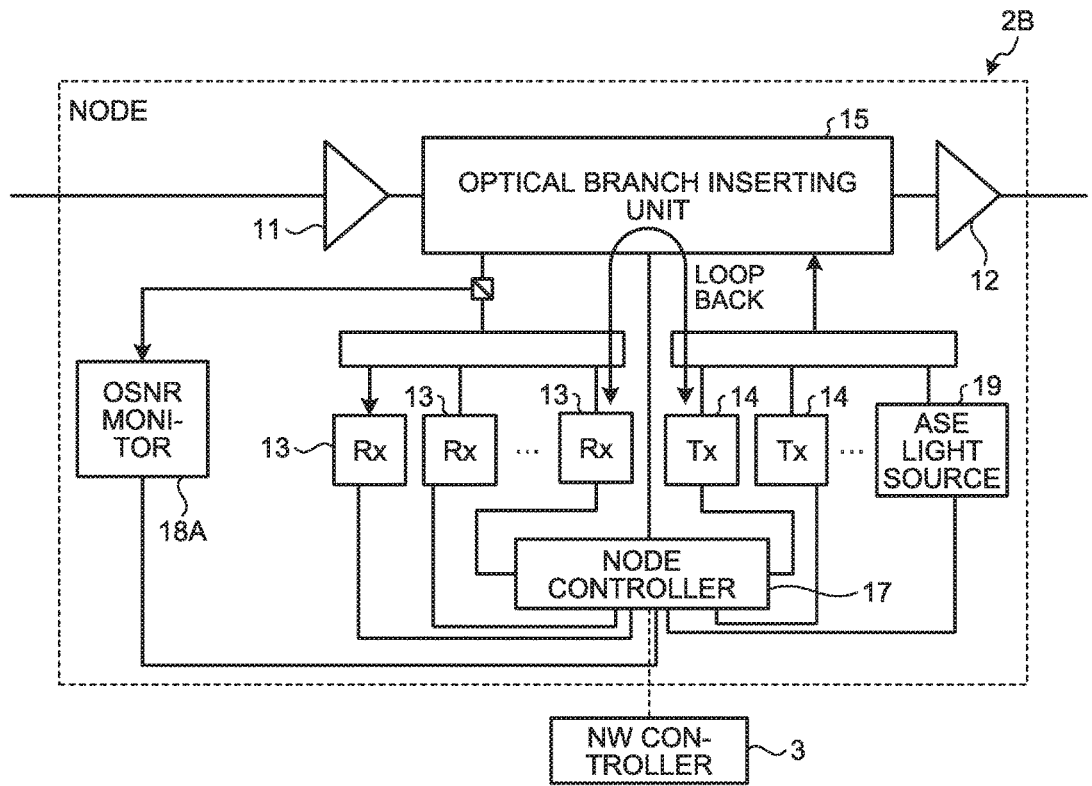
FIG. 25 is an explanatory drawing illustrating an example of hardware configuration of the node according to a sixth embodiment.

FIG. 25 is an explanatory drawing illustrating an example of hardware configuration of a node 2B according to a sixth embodiment. Constituent elements that are the same as those of the node 2 according to the first embodiment will be denoted by the same reference numerals as those of the first embodiment, and the explanation of overlapping structures and operations will be omitted.

The node 2B illustrated in FIG. 25 is different from the node 2 illustrated in FIG. 2, in that the node 2B is provided with an ASE light source 19 on the Tx 14 side, and an OSNR monitor 18A on the Rx side. The ASE light source 19 is a light source emitting light of ASE noise to enable adjustment of the ASE noise intensity. The OSNR monitor 18A monitors OSNR between the Tx 14 and the Rx 13 in accordance with change of the ASE noise from the ASE light source 19 on the Tx 14 side.

Figure 26:
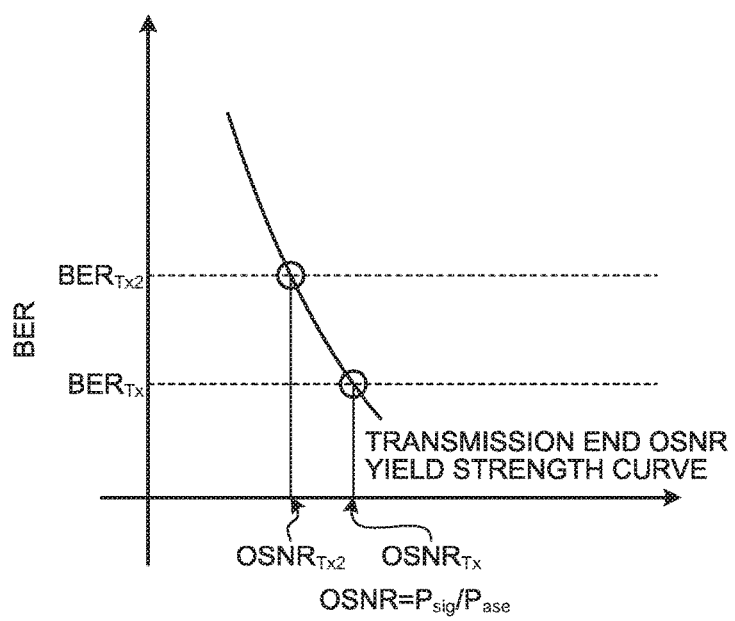
FIG. 26 is an explanatory drawing illustrating an example of a method for acquiring an OSNR yield strength curve according to the sixth embodiment.

The node controller 17 adjusts the ASE light source 19 during B-to-B loopback communication between the Tx 14 and the Rx 13. FIG. 26 is an explanatory drawing illustrating an example of a method for acquiring an OSNR yield strength curve according to the sixth embodiment. The OSNR monitor 18A successively acquires values of the BER and the OSNR in accordance with change of the ASE noise intensity of the ASE light source 19 as illustrated in FIG. 26, and notifies the NW controller 3 of the successively acquired values of the BER and the OSNR.

The NW controller 3 generates a transmission end OSNR yield strength curve based on the values of the BER and the OSNR successively acquired from the transmission end node 2B. Specifically, the NW controller 3 is capable of acquiring a transmission end OSNR yield strength curve in accordance with change of the ASE noise. The NW controller 3 acquires the Tx characteristic parameters η and κ, based on the generated transmission end OSNR yield strength curve and the reception BER acquired from the reception end node 2, and stores the acquired Tx characteristic parameters η and κ in the second storage unit 32.

The transmission end node 2B according to the sixth embodiment successively acquires values of the reception BER and the reception OSNR in accordance with change of the ASE noise of the ASE light source 19, and notifies the NW controller 3 of the successively acquired values of the reception BER and the reception OSNR. In addition, the NW controller 3 is capable of generating a transmission end OSNR yield strength curve in accordance with the successively acquired values of the reception BER and the reception OSNR.

The NW controller 3 according to the first embodiment described above acquires a transmission end OSNR yield strength curve corresponding to the Tx 14 and the Rx 13 in the transmission end node 2 from the first storage unit 31. However, the structure is not limited to the case of acquiring a transmission end OSNR yield strength curve from the first storage unit 31, but a transmission end OSNR yield strength curve may be acquired through communication between the Tx 14 and the Rx 13 in the transmission end node 2. An embodiment in this case will be explained hereinafter as a seventh embodiment.

[f] Seventh Embodiment

Figure 27:
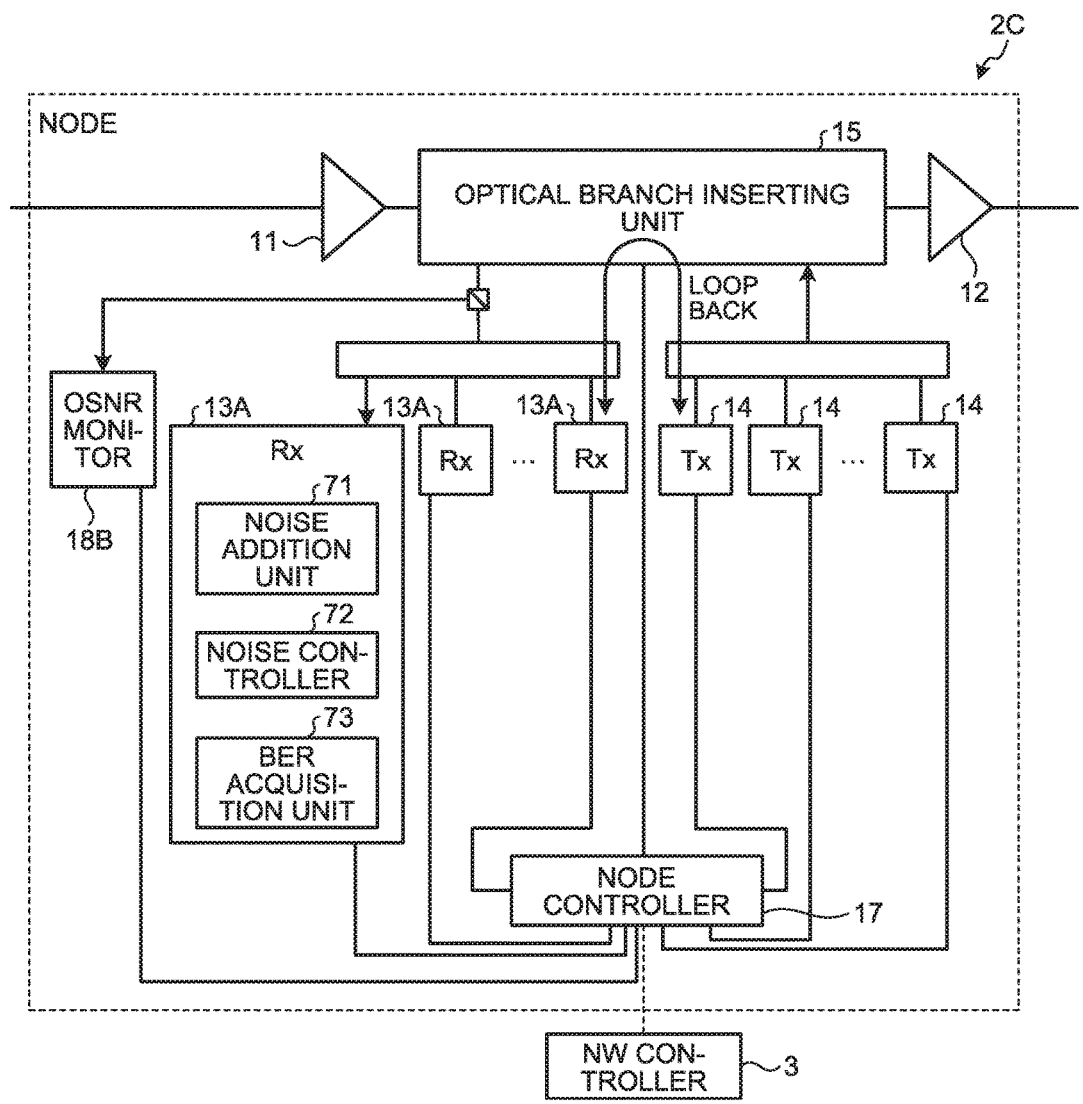
FIG. 27 is an explanatory drawing illustrating an example of hardware configuration of the node according to a seventh embodiment.

FIG. 27 is an explanatory drawing illustrating an example of hardware configuration of a node 2C according to a seventh embodiment. Constituent elements that are the same as those of the node 2 according to the first embodiment will be denoted by the same reference numerals as those of the first embodiment, and the explanation of overlapping structures and operations will be omitted.

The node 2C illustrated in FIG. 27 is different from the node 2 illustrated in FIG. 2, in that the node 2C is provided with a noise addition unit 71 in the Rx 13A, a noise controller 72 in the Rx 13A, a BER acquisition unit 73 in the Rx 13A, and an OSNR monitor 18B.

The noise addition unit 71 adds a noise addition amount to a demodulated electrical signal. The noise controller 72 adjusts a noise addition amount $P_{noise\_Rx\_Add}$ of the noise addition unit 71. The BER acquisition unit 73 acquires the reception BER in accordance with adjustment of the noise addition amount. The OSNR monitor 18B monitors the OSNR with the Tx 14. The node controller 17 collects the noise addition amount, the reception BER and a result of monitoring the OSNR, and notifies the NW controller 3 of the collected noise addition amount, the reception BER, and the OSNR monitoring result.

Figure 28:
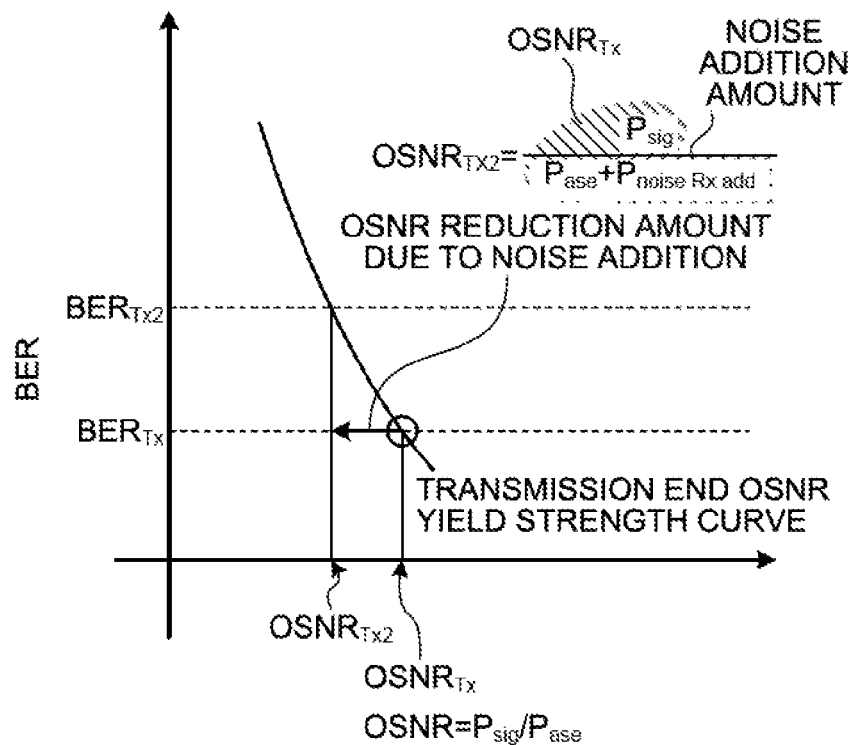
FIG. 28 is an explanatory drawing illustrating an example of a method for acquiring an OSNR yield strength curve according to the seventh embodiment.

FIG. 28 is an explanatory drawing illustrating an example of a method for acquiring an OSNR yield strength curve according to the seventh embodiment. The controller 24 in the NW controller 3 calculates $OSNR_{TX}$ from the transmission end node 2C and $OSNR_{TX2}$ corresponding to the reception BER acquired in addition of noise, as illustrated in FIG. 28. As a result, the controller 24 measures the reception BER and OSNR while changing the noise addition amount, to acquire the transmission end OSNR yield strength curve and the Tx characteristic parameters η and κ.

The NW controller 3 acquires the transmission end OSNR yield strength curve and the Tx characteristic parameters η and κ from the transmission end node 2C, and stores them in the second storage unit 32.

The transmission end node 2C according to the seventh embodiment successively acquires values of the reception BER and the reception OSNR in accordance with change of the noise addition amount added to the demodulated electrical signal, and notifies the NW controller 3 of the successively acquired values of the reception BER and the reception OSNR. In addition, the NW controller 3 is capable of generating a transmission end OSNR yield strength curve in accordance with the successively acquired values of the reception BER and the reception OSNR.

Figures 29, 30:
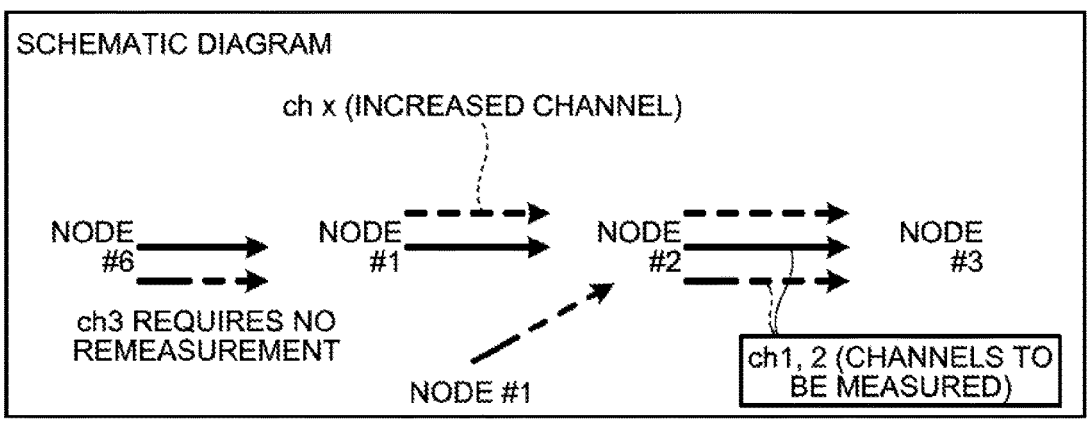
FIG. 29 is an explanatory drawing illustrating an example of a path storage unit.
FIG. 30 is an explanatory drawing illustrating an example of a method for determining a reception end node.

The following is an explanation of a method for determining the reception end node 2 of the NW controller 3 according to the first embodiment described above. Suppose that the reception end node 2 is a reception end node 2 receiving a wavelength signal when a wavelength signal of the increased channel is increased. The NW controller 3 includes a path storage unit 36 storing path information for each channel therein. FIG. 29 is an explanatory drawing illustrating an example of the path storage unit 36. The path storage unit 36 illustrated in FIG. 29 manages a ch number 36A, a transmission end node 36B, a reception end node 36C, and a relay node 36D in association with each other. The ch number 36A is a number to identify a channel of a wavelength signal. The transmission end node 36B is a transmission end node transmitting a wavelength signal of the channel. The reception end node 36C is a reception end node receiving a wavelength signal of the channel. The relay node 36D is a node relaying a wavelength signal of the channel.

For example, when the ch number 36A is "ch1", the transmission end node 36B is "node #7", the reception end node 36C is "node #3", and the relay node 36D is "node #2". When the ch number 36A is "ch2", the transmission end node 36B is "node #6", the reception end node 36C is "node #3", and the relay node 36D is "node #1 and node #2". When the ch number 36A of the increased channel is "chx", the transmission end node 36B is "node #1", the reception end node 36C is "node #3", and the relay node 36D is "node #2".

FIG. 30 is an explanatory drawing illustrating an example of a method for determining a reception end node. When a channel with the ch number 36A being "chx" is increased, the NW controller 3 refers to the path storage unit 36, and acquires the reception $BER_{mea}$ of the reception end node, by designating each of the channels ch1 and ch2 passing through the reception node "node #3" corresponding to the increased channel "chx" as the reception end node.

The constituent elements of the illustrated components are not necessarily configured physically as illustrated. Specifically, specific forms of distribution and integration of the components are not limited to the illustrated ones, but all or part of them may be configured to be functionally or physically distributed or integrated in any unit, according to various loads and use conditions.

In addition, all or any part of the various types of processing functions performed in the devices may be executed on a central processing unit (CPU) (or a microcomputer such as a micro processing unit (MPU) and a micro controller unit (MCU)). In addition, all or any part of the various types of processing functions may be executed on a program analyzed and executed by a CPU (or a microcomputer such as an MPU and an MCU), or hardware by a wired logic.

An aspect of the embodiments enables calculation of a margin of the transmission quality with accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network control apparatus comprising a processor configured to:
    control an optical transmission system including a plurality of nodes connected through the optical fibers;
    calculate a first OSNR corresponding to an allowable limit BER from an OSNR-BER characteristic of a loopback transmission end corresponding to values of OSNR and BER in loopback communication of the a wavelength signal between a transmitter and a receiver in a transmission end node that transmits the wavelength signal;
    acquire a reception BER of a reception end node receiving the wavelength signal, and calculate a second OSNR corresponding to the reception BER from the OSNR-BER characteristic of the transmission end node;
    calculate a first ASE (amplified spontaneous emission) noise intensity corresponding to the allowable limit BER from the first OSNR;
    calculate a second ASE noise intensity corresponding to the reception BER from the second OSNR; and
    calculate an ASE noise intensity margin, based on the first ASE noise intensity and the second ASE noise intensity.

2. The network control apparatus according to claim 1, wherein the processor is further configured to:
    acquire a third OSNR of a reception side corresponding to the reception BER from the reception end node, and calculate a third ASE noise intensity of the reception side from the third OSNR;
    calculate a fourth ASE noise intensity of the reception side corresponding to the allowable limit BER, based on the third ASE noise intensity, the second ASE noise intensity, and the first ASE noise intensity;
    calculate a fourth OSNR of the reception side corresponding to the allowable limit BER from the fourth ASE noise intensity; and
    calculate an OSNR margin, based on the third OSNR and the fourth OSNR.

3. The network control apparatus according to claim 2, wherein the processor is further configured to:
    calculate a nonlinear noise intensity, based on the third ASE noise intensity and the second ASE noise intensity; and
    calculate the fourth ASE noise intensity of the reception side corresponding to the allowable limit BER, based on the first ASE noise intensity and the nonlinear noise intensity.

4. The network control apparatus according to claim 2, wherein the network control apparatus includes a correction table that stores therein a correction value associated with an idler frequency band amount of the wavelength signal before change and an idler frequency band amount of the wavelength signal after change, the idler frequency band amount being a change amount of the idler frequency band between the wavelength signal and an adjacent wavelength signal adjacent to the wavelength signal; and the processor is further configured to:

acquire the correction value corresponding to the idler frequency band amount before change and the idler frequency band amount after change, and correct the OSNR margin based on the acquired correction value.

5. The network control apparatus according to claim 2, wherein the network control apparatus includes a correction table that stores therein a correction value associated with an input power amount of the wavelength signal before change and an input power amount of the wavelength signal after change; and the processor is further configured to:

acquire the correction value corresponding to the input power amount before change and the input power amount after change, and correct the OSNR margin based on the acquired correction value.

6. The network control apparatus according to claim 1, wherein the processor is further configured to:

acquire the OSNR-BER characteristic of the transmission end corresponding to values of OSNR and BER successively measured in loopback communication of the wavelength signal between a transmitter and a receiver in the transmission end node, from the transmission end node.

7. A transmission quality margin calculation method comprising:

controlling, by a processor of a network control apparatus, an optical transmission system including a plurality of nodes connected through the optical fibers;

calculating, by the processor, a first OSNR corresponding to an allowable limit BER from an OSNR-BER characteristic of a loopback transmission end corresponding to values of OSNR and BER in loopback communication of the a wavelength signal between a transmitter and a receiver in a transmission end node that transmits the wavelength signal;

acquiring, by the processor, a reception BER of a reception end node receiving the wavelength signal, and calculating, by the processor, a second OSNR corresponding to the reception BER from the OSNR-BER characteristic of the transmission end node;

calculating, by the processor, a first ASE (amplified spontaneous emission) noise intensity corresponding to the allowable limit BER from the first OSNR;

calculating, by the processor, a second ASE noise intensity corresponding to the reception BER from the second OSNR; and calculating, by the processor, an ASE noise intensity margin, based on the first ASE noise intensity and the second ASE noise intensity.

* * * * *